(12) United States Patent
Hughes et al.

(10) Patent No.: US 9,118,981 B2
(45) Date of Patent: Aug. 25, 2015

(54) CALL MANAGEMENT SERVICE

(75) Inventors: Thomas Michael Hughes, Las Vegas, NV (US); Abdelkareem Siddiq, Concord, CA (US); Sylvain Dufour, Aventura, FL (US); Sandeep Mohanty, Sunny-vale, CA (US)

(73) Assignee: RING2 COMMUNICATIONS LIMITED, London (GB)

( * ) Notice: Subject to any disclaimer, the term of this patent is extended or adjusted under 35 U.S.C. 154(b) by 0 days.

(21) Appl. No.: 13/215,863

(22) Filed: Aug. 23, 2011

(65) Prior Publication Data

US 2011/0305331 A1    Dec. 15, 2011

Related U.S. Application Data

(63) Continuation of application No. 11/578,512, filed as application No. PCT/GB2005/001454 on Apr. 15, 2005, now abandoned.

(30) Foreign Application Priority Data

Apr. 15, 2004 (GB) .................................. 0408457.0

(51) Int. Cl.
*H04M 3/42* (2006.01)
*H04Q 3/00* (2006.01)
*H04M 7/00* (2006.01)

(52) U.S. Cl.
CPC ............. *H04Q 3/0016* (2013.01); *H04M 7/003* (2013.01); *H04M 7/006* (2013.01); *H04Q 2213/1305* (2013.01);
(Continued)

(58) Field of Classification Search
USPC ....................................................... 379/202.01
See application file for complete search history.

(56) References Cited

U.S. PATENT DOCUMENTS 6,496,201 B1 * 12/2002 Baldwin et al. ................ 715/753
6,731,609 B1 *  5/2004 Hirni et al. ..................... 370/260
(Continued)

FOREIGN PATENT DOCUMENTS

EP    1075132    2/2001
EP    1 377 004  1/2004
(Continued)

OTHER PUBLICATIONS

International Search Report for International Patent Application No. PCT/GB2005/001454 dated Jul. 26, 2005.
(Continued)

*Primary Examiner* — Joseph J Nguyen
(74) *Attorney, Agent, or Firm* — Pearl Cohen Zedek Latzer Baratz LLP

(57) ABSTRACT

The invention pertains to a call management service for a communications system, configured to automatically: receive telephone call data identifying a destination end point and identifying a source end point; initiate a call-back telephone call to said source end point to set-up a first call leg responsive to receiving said telephone call data; initiate a telephone call to said destination end point to set-up a second call leg; combine said first and second call legs together thereby to provide voice communication between said source and destination end points; and transmit call leg status signals for said voice communication over a separate real-time communications connections signalling link to a communications client associated with at least one of said end points.

6 Claims, 31 Drawing Sheets

(52) U.S. Cl.
CPC ............ *H04Q 2213/1326* (2013.01); *H04Q 2213/13091* (2013.01); *H04Q 2213/13106* (2013.01); *H04Q 2213/13175* (2013.01); *H04Q 2213/13176* (2013.01); *H04Q 2213/13204* (2013.01); *H04Q 2213/13389* (2013.01)

(56) References Cited

U.S. PATENT DOCUMENTS

| | | | |
|---|---|---|---|
| 7,295,852 B1 * | 11/2007 | Davis et al. | 455/518 |
| 7,457,404 B1 * | 11/2008 | Hession et al. | 379/265.07 |
| 7,606,909 B1 * | 10/2009 | Ely et al. | 709/227 |
| 8,396,205 B1 * | 3/2013 | Lowry et al. | 379/265.12 |
| 2002/0078150 A1 | 6/2002 | Thompson et al. | |
| 2002/0118675 A1 | 8/2002 | Strathmeyer et al. | |
| 2003/0059015 A1 * | 3/2003 | Eber et al. | 379/201.02 |
| 2003/0073430 A1 * | 4/2003 | Robertson et al. | 455/416 |
| 2004/0006595 A1 * | 1/2004 | Yeh et al. | 709/204 |
| 2004/0125933 A1 * | 7/2004 | Jun et al. | 379/202.01 |
| 2004/0133641 A1 | 7/2004 | McKinnon et al. | |
| 2004/0196867 A1 * | 10/2004 | Ejzak et al. | 370/468 |
| 2004/0246332 A1 | 12/2004 | Crouch | |
| 2005/0151836 A1 * | 7/2005 | Ni | 348/14.09 |
| 2005/0157731 A1 * | 7/2005 | Peters | 370/401 |

FOREIGN PATENT DOCUMENTS

| | | |
|---|---|---|
| GB | 2320641 | 6/1998 |
| JP | 2001-119477 | 4/2001 |
| JP | 2001-157186 | 6/2001 |
| JP | 2002-542723 | 12/2002 |
| JP | 2003-051899 | 2/2003 |
| JP | 2005-512421 | 4/2005 |
| WO | WO 00/64123 | 10/2000 |
| WO | WO 03/049459 | 6/2003 |
| WO | WO 03/094432 | 11/2003 |
| WO | WO 03/094433 | 11/2003 |

OTHER PUBLICATIONS

English Translation of Office Action for Japanese Patent Application No. 2007-507846 dated Nov. 2, 2010.

Office Action for U.S. Appl. No. 11/578,512 dated Jul. 21, 2010.

Final Office Action for U.S. Appl. No. 11/578,512 dated Feb. 23, 2011.

* cited by examiner ring2

You are logged in as: [USER]    logout conference calls    text2call    my calls    my profile    help

Schedule New Conference                                    200

Title: [                    ] — 210  Required information

Billing Code: [          ]

Recurrence: [One time ▼]  — 212

Date: [18 ▼] [May ▼] [2005 ▼] 📅

Start time: [15 ▼] [00 ▼]  [(GMT/BST) London, Dublin, Edinburgh ▼] 🔅 Daylight Savings Time in effect
         214                    216

Estimated duration: [30 mins ▼] — 218

Request SMS text reminder: ☐  [10 mins before start ▼] — 222
                         220 at [44 ▼]     phone number
country code

Figure 13a

Email participants:
To: view contacts
Please seperate each address with a semi-colon or comma. —224

Bcc: view contacts
Please seperate each address with a semi-colon or comma. —226

Message:

Add Attachments: Add —228
Options: ☐ Roll Call ❷    ☐ Require leader ❷ —230

Access Numbers: UK Dial-in: +44 20 7### ####
US Dial-in: +1 555 555 5555

Schedule This Call    Cancel

Legal  Privacy  Contact Us  Help  Corporate
Copyright 2005 Ring2 Communications Ltd

CALL MANAGEMENT SERVICE

CROSS-REFERENCE TO RELATED APPLICATIONS

The present application is a continuation of U.S. patent application Ser. No. 11/578,512, filed on Jul. 27, 2007 now abandoned, which was a national phase application of International Patent Application No. PCT/GB2005/001454, entitled "CALL MANAGEMENT SERVICE" filed on Apr. 15, 2005, which in turn claimed priority from United Kingdom Patent Application No. 0408457.0, filed on Apr. 15, 2004, each of which is incorporated by reference in its entirety.

BACKGROUND OF THE INVENTION

The present invention relates to a telecommunications apparatus, system and method; in particular, but not exclusively, to a system for managing telephone call set-up and in-call functions irrespective of the type of underlying network.

Telephony systems and services are ubiquitous, and are used for both residential and business purposes. The services and features provided by telephony systems have developed from simple person-to-person calls, to conference calls where many parties are connected together at a time. Telephony terminal devices have developed beyond the simple telephone to incorporate many features such as an address book of telephone numbers and quick dial telephone numbers, typically under microprocessor control. Examples of telephony devices are regular fixed line handsets (an illustrative example of which is the "Duet 60" Corded Phone sold by BT pic), more sophisticated fixed line telephony terminals (an illustrative example of which is the Meridian M3904 Professional Telephone sold by Nortel Networks), mobile/cellular handsets, mobile/cellular enabled personal digital assistants (PDAs) and other mobile/cellular terminals, or Internet Protocol (IP) telephones.

More sophisticated features are often required by businesses, and such features may be supplied by a Private Automatic Branch Exchange (PABX), also referred to as a Private Branch Exchange (PBX), which is installed at business premises for running an internal telephony system and interfacing to an external telephone system, for example a Public Switched Telephone Network (PSTN).

An example of a conventional telephony system is illustrated schematically in FIG. 1. The conventional telephone system is based on circuit switched connections which establish an "end-to-end" connection between parties to a call. The core of the telephone system is the Public Switched Telephone Network (PSTN) 2. Individual telephone terminals 4,6 may be connected to the PSTN 2 by local exchanges (not shown). Cellular telephone systems such as the Global System for Mobile devices (GSM) may also be connected to the PSTN 2 by way of a Mobile Switching Center (MSC) 8. Telephone calls from a cellular telephone (or more generally mobile terminal) 10 to a telephone terminal 4,6 connected to the PSTN 2 are routed through a base station 12 to a MSC 8, and then into the PSTN 2 for example for connection with a telephone terminal 4,6.

Many businesses operate a PABX 16 which provides enhanced telephony features for the telephones 14 of their internal telephony network, and may also provide call conferencing features with external telephones 4, 6, 10. Each PABX 16 has a fixed number of telephone lines 18 providing communication to the PSTN 2, and if the PABX 16 provides conference call features it also comprises one or more so-called "call bridge modules" 20. Each call bridge module provides call connections between a fixed number of lines, typically 3 or 5 parties.

Telephone calls need not be made over the circuit switched PSTN 2, but may use packet switched technology and be sent over an Internet 22 using an Internet Protocol communications format provided the PABX 16 has a Voice over Internet Protocol (VoIP) module 24. VoIP calls are directed over the Internet 22, for example to an IP endpoint 26 such as an Internet enabled telephone or a computer system having a software client providing telephony functions.

If facilities for linking more than 3 or 5 parties to a conference call are required, then typically the only way to provide this additional functionality is to add more bridge modules 20 to the PABX 16. Each bridge module 20 represents a cost to the business, and if large conference call facilities are only required occasionally then a number of the bridge modules 20 purchased to provide large call conferencing facilities would remain unused for much of the time. This represents a significant waste of resources.

Furthermore, as the number of external parties to a call is limited by the number of outside lines 18 supported by the PABX 16 and the cost of a PABX depends on the number of external lines it has to handle, provision for conferencing a large number of external parties via the PABX 16 requires a significant capital investment for functionality that may only be used occasionally.

Telephone handsets 14 may also limit the number of parties that can join in a call. Advanced handsets may allow multiple call conferencing, but some are limited to 3-way calling or do not support conference call features at all. Typically such multi-way call conferencing has a highly restricted and awkward user interface. For example, in simple 3-way calling it is necessary to first call a party, wait until they have been connected, park that call, call a second party and then connect the calls together. For more than 3-way calling connecting all the parties to the call can be a particularly laborious and time-consuming process. Furthermore, each supplier of handsets and/or PABXs often have multiple, and non-standard, complex function button or key strokes for conferencing in additional parties to an ongoing call. This mitigates against multi-party impromptu call conferencing.

Manual dialling of numbers not yet programmed into a handset or telephony device address book or speed dial system also mitigates against ad-hoc multi-party conference calls, and telephone calling in general. Furthermore, the more features a handset 14 has, the greater the cost of the handset which is wasted if the handset is primarily used for simple 2-way calling. Additionally, with conventional PABX/handset controlled call conferencing the initiator (leader) of a call cannot drop a particular party (call leg) without dropping the whole call. This means that whilst an individual conference call participant can be asked to leave a conference call, the call leader cannot establish that they have actually done as requested. Consequently, a party may continue to listen into a conversation even after they have been asked to leave.

Another drawback is that different service providers may be used for setting up scheduled conference calls, where invitees "dial-in" to the conference call at the scheduled time. Thus, different protocols and telephone numbers have to be used to set up the conference calls.

The number of telephone numbers stored by a telephone handset, whether or not a conventional handset 4, 6, 14, is often limited—particularly when compared to the number that can be stored in a cellular telephone 10. Additionally, address books are often on Personal Digital Assistants (PDAs) and in desktop applications such as Contacts in Microsoft® Outlook. The PDA, which sometimes includes a cellular telephone, is generally kept with a user at all times and often has the most up-to-date address/telephone number information. Synchronising a cellular telephone with a PDA or Outlook, then ensures that the cellular telephone is up-to-date.

An artefact of the foregoing is that a cellular telephone 10 user will often call direct from their cellular telephone, even when at their desk with a land line telephone to hand, due to the convenience of having their telephone numbers stored in the address book, and being able to dial directly from them. However, cellular telephone calls are generally more costly than landline calls and this habit of cellular phone users leads to increased telephony expenses either for the business, or for the user in their personal capacity.

This problem is further exacerbated by the fact that many landline telephone handsets do not have telephone address book functionality, and those which do are generally limited to just a few telephone numbers, for example 10, and further require programming with the desired numbers even though those numbers may already be stored in the user's cellular telephone, PDA or desktop address book applications.

GB 2320641 has previously proposed to provide an internet-connected PC to send a call-initiation message via the internet to a service provider's web server, which then instructs a PSTN switch to make a call over the PSTN to the user's PSTN handset. When the user answers, the PSTN switch then calls the destination PSTN number and when that is answered, the PSTN switch joins the two call legs together. It has also previously been proposed to add further PSTN legs to the call and bridge them within the PSTN switch.

Whilst such a system provides the user with call conferencing functionality, and enables the user to take advantage of lower cost networks, a number of significant problems exist. For example, in such a system the functionality of the system as a whole is limited by the functionality of the PSTN switch and the interface by means of which the user communicates with the switch. Typically control mechanisms are html web pages (or so-called 'thin' clients running within browsers), email messages or SMS messages. Such control mechanisms require the use of an intermediary server to translate requests from these interfaces into a protocol understandable by the PSTN switch. In such an architecture the level of control and responsiveness of calls is limited. Moreover, such control mechanisms do not consist of independent software running on the operating system of the user's control device and consequently cannot interface with other programs running on the user's control device to provide enhanced functionality and usability.

Other systems have previously proposed to mix different legs of calls in a two-party or multi-party or conference call in software within an IP environment instead of in hardware resident on a PSTN switch. A current illustrative example of such an arrangement is eDial's Advanced Communications Server™, although we do not know when this server was first made available to the public.

Such systems, whilst mitigating some of the problems outlined above, are problematic because such switches are expensive (both in financial terms, and in terms of the resources required to install and maintain them). As a consequence, such switches tend only to be sold to large enterprises who can afford the equipment and are capable of implementing the solution, managing it and supporting it as it operates within their existing IT structure. A consequence of such solutions is that they are not best suited to the residential or small-medium sized business.

It is also well known in the art to use a software program (called a Telephony Application Programming Interface or TAPI) to connect a PC running an application within the Microsoft Windows operating system to telephone services. TAPI was introduced in 1993 as the result of joint development by Microsoft and Intel. The standard supports connections by individual computers as well as LAN connections serving many computers. Within each connection type, TAPI defines standards for simple call control and for manipulating call content.

Problems with TAPI are that a TAPI has to be created for each application and therefore requires separate installation or download by the user of a TAPI for each application that the user requires. Their operation can also be different from application to application depending on the creator. Additionally, TAPI based programs only provide the interface between the program running on the PC and some external communication service rather than a complete communication solution.

In an attempt to gain cost savings and take advantage of the benefits offered by carrying voice over IP networks (VoIP) instead of the PSTN, it has previously been proposed to provide a hardware plug-in that converts the PSTN voice signal from a user's telephone into a digital, packetised signal that then is fed into the user's broadband internet connection. Vonage provide one such hardware plug-in, although again we do not know whether this plug-in was available to the public before the filing of this application.

Problems with such systems include having to insert an extra piece of hardware into the user's network, requiring extra expense, configuration expertise and cabling. A major limitation is that calls over the service can only be made using the phone connected to the hardware plug-in. As the voice can only go through the internet, if the user's internet connection is of inconsistent quality, the quality of their call suffers and if they lose their internet connection, they lose the call. Moreover, such solutions typically contemplate replicating the functionality of the PSTN at lower cost rather than introducing new features and functionality to improve productivity and usability.

A further previously proposed alternative is that of the so-called "softphone". The most common type of softphone is a software client residing on a user's PC and which must have both microphone and speaker functionality, or external equivalents connected to the PC. The user then communicates through the PC purely over VoIP. Skype and Vonage each currently offer a VoIP phone, although again we do not know whether these phones were available before the filing date of the present application.

Problems include that the user is limited to talking through their PC. The PC is required to run the compression and decompression protocols (CODEC) of the software and as a result voice quality may be impacted if the computer is processing other CPU intensive tasks during a conversation. If their internet connection is of inconsistent quality, the quality of their call suffers. If they lose their internet connection, they lose the call. In addition, these solutions are not handset independent—the connection of the call-leg to the call originator must be to the PC, not for example to a PSTN or cellular or mobile telephone of the originator's choosing. PCs are poorly configured as telephones and require extensive configuration to balance ear and microphone volume for comfortable communication.

SUMMARY OF THE INVENTION

The foregoing problems and drawbacks associated with conventional and previously proposed telephone systems mitigate against efficient and cost-effective use of desktop and other telephone handsets, typically by requiring relatively expensive and complex modules in the handsets and/or PBAX to fully provide conference call functionality. Aspects and embodiments of the present invention were devised with the foregoing in mind.

In accordance with a presently preferred embodiment of the invention, there is provided a call management service for a communications system, configured to automatically: receive telephone call data identifying a destination end point and identifying a source end point; initiate a call-back telephone call to said source end point to set-up a first call leg responsive to receiving said telephone call data; initiate a telephone call to said destination end point to set-up a second call leg; combine said first and second call legs together thereby to provide voice communication between said source and destination end points; and transmit call leg status signals for said voice communication over a separate real-time communications connections signalling link to a communications client associated with at least one of said end points.

The use of a client installed onto a user's PC, PDA or mobile phone allows (a) a much tighter integration of calling into the operation of the user's device (b) communication enhancements with the system's back end by use of a fully implemented SIP (or other equivalent protocol) stack and (c) independent running of internal client threads and timers.

The reasons for this are as follows:

(a) A communications client of the type described herein runs as an independent program within the operating system of the device (for example not as a Java application within a browser). This allows the client to interact with the operating system and other programs running on the end user's device. For example, in the case of a communications client of the type described herein running on a Windows based PC, this arrangement allows the client to interact with other applications on the PC for example to allow information to be passed to the client to initiate a phone call, set a project code, pull in data to the client or other interactive service.

An example of such an application is the ability of the communications client to recognize certain 'key press combinations to initiate a call to any highlighted number. Mechanically what happens is that when the key sequence has been entered the communications client tells Windows to copy whatever the currently selected area is and paste the contents to the Windows Clipboard. From there the communications client pastes the contents into the module which strips away everything but the phone number, validates it against the established number verification rules either requests that the communications client places a call to the selected number if it passes the verification check or throws up a dialog requesting further clarification from the user if the selection fails in number validation.

Another example of such an application would be the ability of the communications client to pull data from other applications for use within the communications client. In this example, the communications client investigates the PC to establish if there are any contact information data sources that could be imported and used into the client. Upon detection of an available contact data source (e.g. Outlook, Outlook Express or Exchange) the client asks the user for permission to import the contact information from this source and then the data is brought into the client and stored in a phonebook for quick and easy access.

(b) A communications client of the type described herein is able to carry a full implementation of a SIP stack within its code base. This allows the client to issue and receive full real time communications with the Application Server or Call Controller/Call Mixer to issues commands, receive updates of in-call events and other general service updates. The presence of a SIP stack within the communications client means that the client can communicate with the Call Controller/Call Mixer directly, without going through an intermediary server for protocol conversion. Such direct communication with the Call Controller/Call Mixer means that during a call, the communications client virtually instantaneously updates the user as to the status of the various call legs involved and can rapidly instigate new legs or access in call features such as 'record call', 'drop leg', 'hold leg', 'mute leg', etc., etc.

(c) A communications client of the type described herein is able to run and manage its own internal threads and timers allowing the client to request updates from the Application Server and to provide additional call related controls from within the client. For example, the client can establish communication with the Application Server on a regular basis (for example every 2 minutes) to receive updates regarding such pertinent information as: the appropriate datacenter to initiate the next call from; whether a new scheduled conference call has been created and needs to be updated on the Communications Client display; if new account information such as an Administrator created company wide phone book has been updated and needs to be downloaded into the client.

Furthermore, the client can detect when internet connectivity has been interrupted and upon re-establishment of the connection, the client can request an update from the Application Server to find out if there are any ongoing calls for which the client should be reporting call state for the user. This allows the client to seamlessly recover state after interruption of internet connectivity.

Previously proposed systems have tended to use a web interface or thin client for call initiation and control and this implies the use of an intermediary web server device to translate the simple instructions from the thin client (often in a simplified proprietary protocol) into instructions understandable by the Call Controller. Such a scenario means that the thin client cannot interact with other programs running on the user's device, Another advantage of the arrangement proposed herein is that it not only supports termination points on the PSTN, but also supports direct connection via IP to SP based, VoIP end points. Examples of SIP end points include softphone clients (such as MSN Messenger) and hardware based P Phone solutions. Such architecture allows call legs between the ring2 datacenter and the user's SP terminal to be carried out over P rather than going through a translation to PSTN protocols, hi such an environment, users can experience significant cost savings as VoP legs are generally cheaper to provision than PSTN legs and the overall responsiveness of the system in terms of call set up times will be augmented since there will be no protocol translation between the request to initiate a call and the provisioning of the media stream itself.

A further embodiment of the present invention pertains to a method of operating data processing apparatus for providing a call management service, comprising: receiving telephone call data identifying a destination end point and identifying a source end point; initiating a call-back telephone call to said source end point to set-up a first call leg responsive to receiving said telephone call data; initiating a telephone call to said destination end point to set-up a second call leg; combining first and second call legs together thereby to provide voice communication between said source and destination end points; and transmitting call leg status signals for said voice communication over a separate real-time communications connections signalling link to a communications client associated with at least one of said end points.

Yet another embodiment of the invention relates to a method of operating a data processing apparatus to provide a communications client for a communications system, comprising establishing a separate real-time communications connections signalling link to a call management service, said signalling link separate from a voice communications channel, responsive to instantiation of said method and communicating a conference call set-up request comprising conference call schedule information and contact information for two or more conference call participants to said call management service via a communications link.

A further embodiment of the invention relates to a communications client for a communications system, said communications client responsive to instantiation thereof to establish a separate real-time communications connections signalling link to a call management service, said signalling link separate from a voice communications channel, and said communications client operative to communicate data messages to said call management service via a communications link, said communications client associated with a conference call participant and configured to display a call status icon for a participant call leg.

Another embodiment of the invention relates to a method of operating data processing apparatus for providing a communications client for a communications system, comprising establishing a real-time communications connections signalling link to a call management service responsive to instantiation of said communications client, said signalling link separate from a voice communications channel.

Other embodiments, and features and advantages of those and other embodiments are set out by way of illustration in the accompanying claims. and elsewhere in the description.

BRIEF DESCRIPTION OF THE DRAWINGS

Specific embodiments of the present invention will now be described with reference to the following drawings, provided by way of example only, in which:

FIGS. 13a and 13b are illustrative representations of a conference call set-up form;

FIG. 16 is a schematic representation of a confirmation web-page provided to the leader following set-up of a conference call;

DETAILED DESCRIPTION OF THE INVENTION

Figure 1:
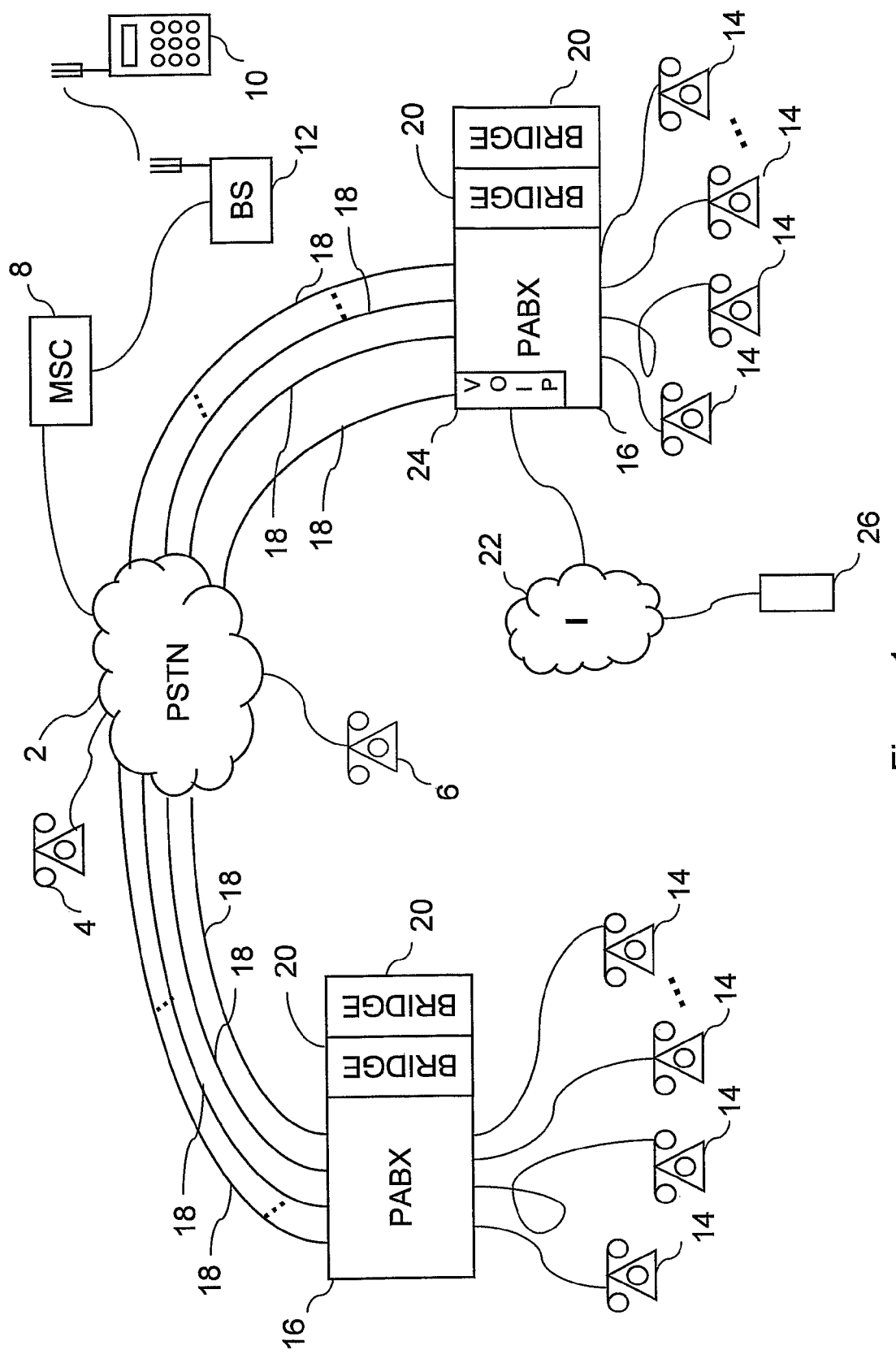
FIG. 1 is a schematic illustration of a conventional telephony network.
Figure 2:
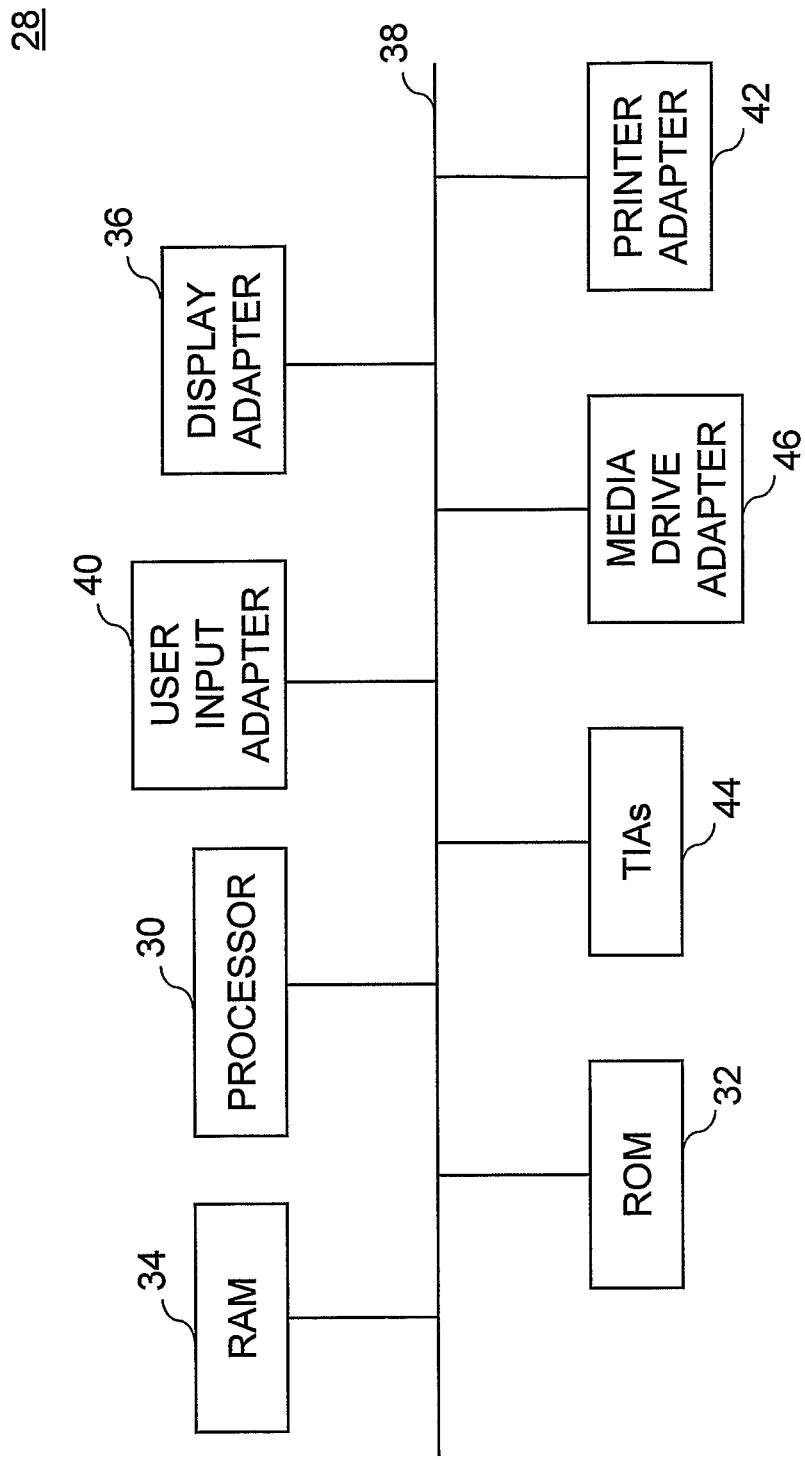
FIG. 2 is a schematic illustration of a data processing apparatus.

Embodiments of the present invention may be implemented on data processing apparatus such as that shown in a schematic and simplified form in FIG. 2. As shown in FIG. 2, the data processing apparatus comprises various data processing resources such as a processor (CPU) 30 coupled to a bus structure 38. Also connected to the bus structure 38 are further data processing resources such as read only memory 32 and random access memory 34. A display adapter 36 connects a display device, such as a cathode ray tube or LCD flat screen display, to the bus structure 38. One or more user-input device adaptors 40 connect the user-input devices, including for example a keyboard and mouse, to the bus structure 38. An adapter 42 for the connection of a printer may also be provided. One or more media drive adaptors 46 can be provided for connecting media drives such as an optical disk drive, a floppy disk drive, a hard disk drive or a high volume storage media such as a RAID array, to the bus structure 38. One or more telecommunications adaptors 44 can be coupled to the bus structure to provide processing resource interface means for connecting the data processing apparatus to one or more networks or to other computer systems. The communications adaptors 44 could include one or more of a local area adaptor, a modem and/or an ISDN terminal adaptor, or serial or parallel port adaptors, etc. as required.

It will be appreciated that FIG. 2 is a schematic illustration of one possible implementation of a data processing apparatus which may be suitable for a computer system acting as a server computer system or a client computer system such as desktop or laptop computer system. Furthermore, the data processing apparatus may be implemented within a mobile telephone, a PDA or IP network terminal device—in which case some of the system elements mentioned above may not be provided.

A computer program for implementing various functions or conveying various functions (for example from a remote store for local execution) or conveying various information for configuring the data processing apparatus 28 may be supplied on media such as one or more CD-ROMs and/or floppy disks and/or Digital Versatile Disks (DVDs) and then stored on a local magnetic media such as a local hard disk, for example. A program implementable by the data processing apparatus may also be supplied over a telecommunications medium, for example embodied as an electronic signal conveyed over a telecommunications network and/or the Internet. For a data processing apparatus implemented in a wireless device such as a cellular telephone, the telecommunications medium may be a radio frequency carrier wave carrying suitably encoded signals representing the computer program and/or data or information. Optionally, the carrier wave may be an optical carrier wave for an optical fibre link or any other suitable carrier medium for a land line link between the data processing apparatus and telecommunications system.

Figure 3:
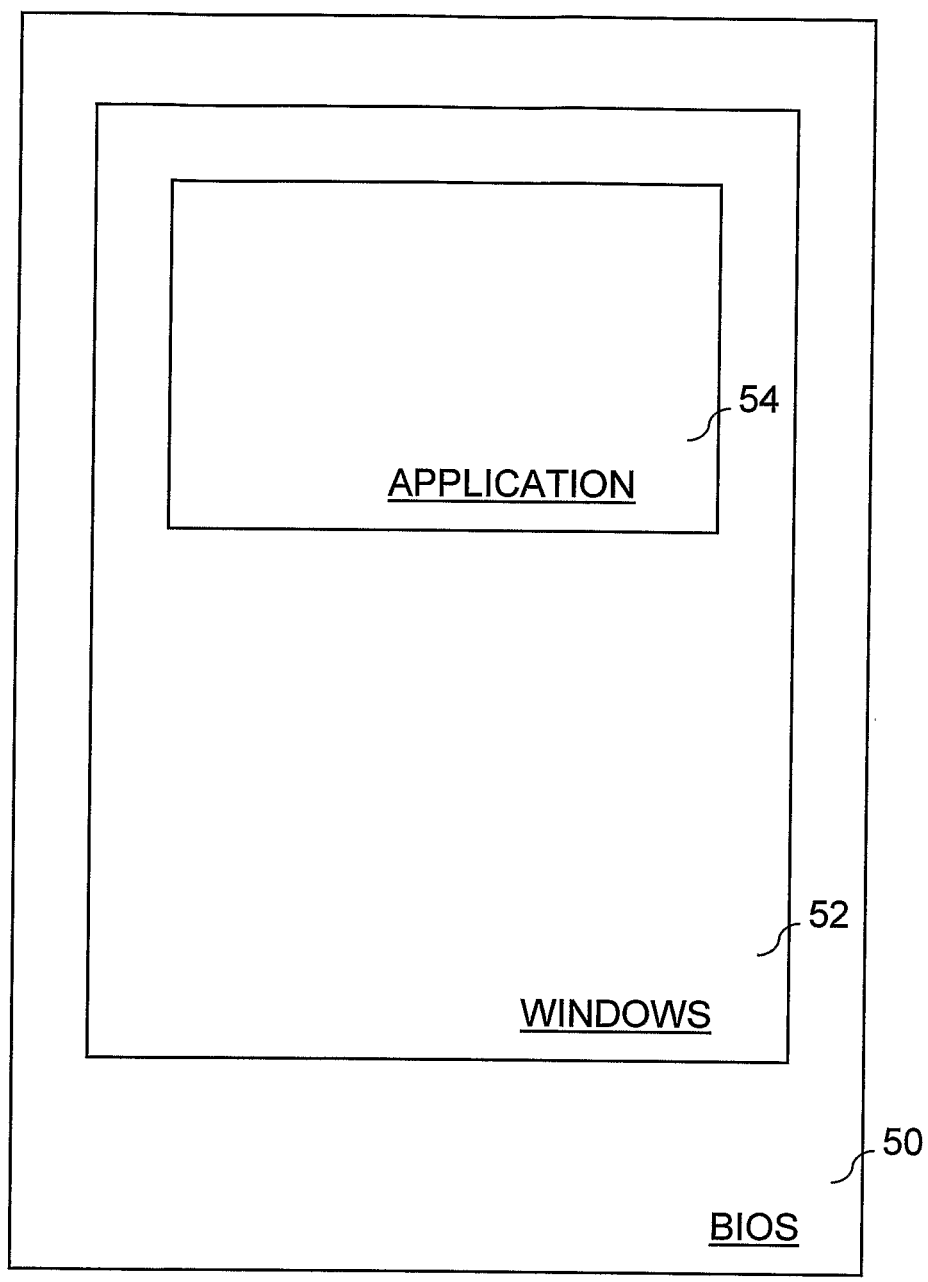
FIG. 3 schematically illustrates a computer program hierarchy suitable for the data processing apparatus illustrated in FIG. 2.

FIG. 3 is a simplified and schematic illustration of an example of computer software hierarchy such as may be implemented on a data processing apparatus as illustrated in FIG. 2. The Basic Input Output System (BIOS) 50 typically resides on a chip forming a part of a processing resource 30 of the data processing apparatus 28, and comprises computer program routines for handling input and output functions and providing an interface between the data processing apparatus operating system and peripheral hardware such as user input devices over the user-input adaptor 40, for example. The BIOS 50 supports all the peripheral technologies and internal services such as real time clocks (time and date).

On start-up, the BIOS tests the data processing system and prepares it for operation by querying the various configurations settings and searching for other BIOSs on various processing resources associated with the data processing apparatus, such as plug-in boards and also setting up pointers such as interrupt vectors in its memory resources to access those routines. An operating system 52 is then loaded and control passed to it. Generally, the BIOS accepts requests from peripheral device drivers as well as from application programs that are run on the data processing apparatus 28. Generally, the BIOS is stored in ROM memory 32, although adaptable and updatable BIOSs are often stored on a flash memory chip which may be upgraded by software.

In the illustrated example the operating system is a Microsoft Windows® 52 operating system available from Microsoft Corporation, and provides the platform for a full-function communications client 54. In the described embodiments the communications client 54 may be either a communications software client residing on user terminal devices such as a desktop 28 or laptop 56 computer (FIG. 4), a PDA, a cellular telephone 58 or a general IP terminal device 59 for providing a user interface for the system in accordance with an embodiment of the invention. Alternatively, the communications client resides on a data processing apparatus forming a part of a server computer system or systems for providing a telephony system in accordance with an embodiment of the present invention. The basic operation of an embodiment of the present invention will now be described with reference to FIG. 4.

Figure 4:
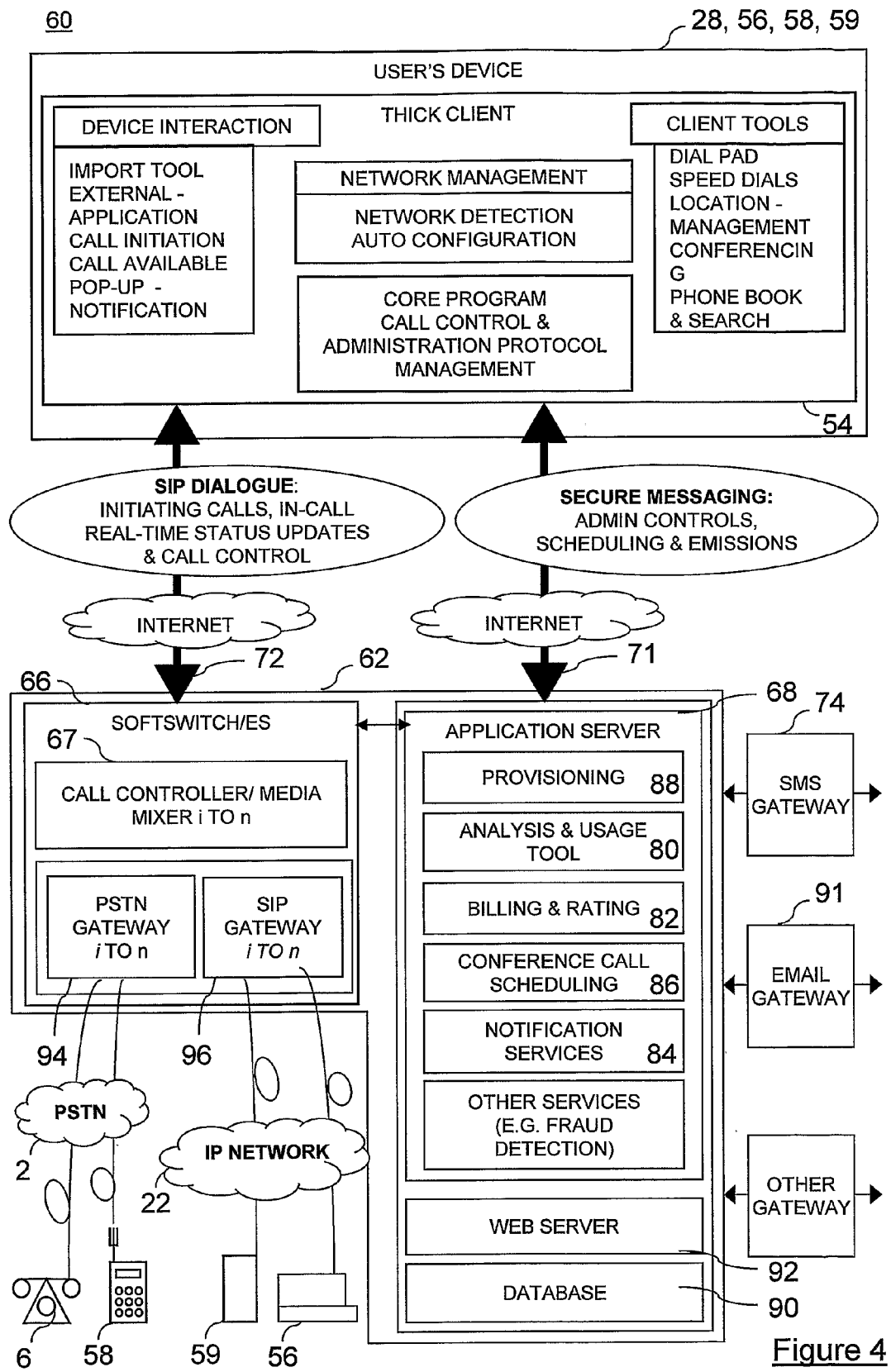
FIG. 4 schematically illustrates a telephony network in accordance with an embodiment of the present invention.

FIG. 4 schematically illustrates a telephone system 60 incorporating a call management centre (CMC) 62 and the communications client 54. The CMC 62 may be implemented on one or more data processing apparatus typically configured as one or more servers, as described with reference to FIG. 2 and FIG. 3 above. The i servers may be located at the same physical location, even within the same device, or distributed throughout various physical locations that are in communication with one another (for example by means of an internet, WAN, or LAN).

The CMC 62 comprises 4 main components: an application server 68, a web server 92, a database 90 and a soft switch 66. The functions of each of these components will be set out in more detail below. A summary is given here. The soft switch 66 contains software for initiating, controlling and mixing calls made by Call Controller/Media Mixer 67 through the desired transport medium, whether that is PSTN 2 (thereby allowing delivery to PSTN handsets and cellular mobile phones) or the IP Network 22 (allowing delivery to a SIP-endpoint such as a SIP phone on a managed VoIP network or the internet), and reporting on the status of each call (and each leg of each call). The application server 68 receives log-in and log-out commands from the communications client 54, as well as call scheduling information and SMS call initiation requests (in which case the application server authenticates the requests and then communicates with the Soft Switch in order to carry out the requests) over a first secure messaging protocol channel 71.

The application server contains software for services as required by the desired system, for example a billing & rating module 82, notification services 84, analysis usage tool module 80, and provisioning tools 88. A suitable Call Controller/Media Mixer is the eDial AudioPresenter available from eDial, Inc., 266 Second Avenue, Waltham, Mass. 02451, USA.

The communications client 54 in accordance with an embodiment of the present invention is a key feature of the system 60, and is operable to perform several functions and to provide a user interface between the user device 28, 56, 58, 59, and the CMC 62 for initiating and controlling calls using the managed service. As befits a full-function communications client 54, the communications client 54 contains a number of different software modules, the operation of which is not critical to an understanding of the present invention and hence will not be described in detail.

As mentioned above, the application server 68 includes an analysis usage tool module 80 which collects statistics on the calls that have been made through the CMC 62, and also a billing and rating module 82. The analysis and usage tool 80 and billing and rating module 82 do not have a functional bearing on the present invention and so no further description thereof will be made.

As will later be described, the Notification Services module 84 is operable to send reminder messages to conference call invitees to remind them of a start time of a conference call scheduled on the application server 68 by a user or users, and a Conference Call Scheduling module 86 manages scheduled conference calls. The Provisioning module 88 contains user data such as user name, password and other information for setting up and implementing a call service and account for a given user.

The CMC 62 also has a high volume data storage unit 90 and one or more web servers 92 for communicating between the CMC 62 and web enabled devices. The CMC is also connected to various gateways to allow the exchange of information with various external networks in various formats for example for e-mailing notification messages to conference call participants via an e-mail gateway 91.

The soft switch 66 has two network facing sides; a PSTN side 94 for setting up telephone call legs over the PSTN 2, and a IP side 96 for setting up VoIP call legs over an Internet 22 or any other underlying transport network. The soft switch 66 further comprises a Call Controller/Media Mixer 67 operable to mix a plurality of media streams.

In general outline, if the communication is a 'log in' or 'log out' request, the communications client 54 sends the request via a secure messaging protocol to the application server 68 for execution of the appropriate authentication and processing. If the communication is for call initiation or control, the communications client 54 sends the communication directly to the relevant soft switch 66 via a separate real-time communications channel 72, preferably a SIP communications channel.

In essence, the arrangement is such that the communications client 54 is arranged to communicate directly with the soft switches 66 by means of the aforementioned SIP protocol, or any other suitable network protocol, for call related data exchange—for example on initiation or during the course of a call. Non-call related communications, on the other hand, between the communications client 54 and application server 68 are accomplished by means of a secure messaging protocol.

On attempted log-in by a user to the communications client, the communications client 54 opens a secure messaging protocol dialogue with the application server 68 and transmits the user's log-in information to the application server 68. The application server 68 invokes a verification routine for checking user identification information forwarded to it against the data held by the provisioning module 88 for verifying and authenticating the user to the service If the user is authorised, the Application Server notifies the communications client 54, via the aforementioned secure messaging protocol 71 that the user is authorised and logged onto the service, as well as updating the Phonebook and passing on administrative information including which soft switch the user's communications client 54 should communicate with to make calls.

Figure 5:
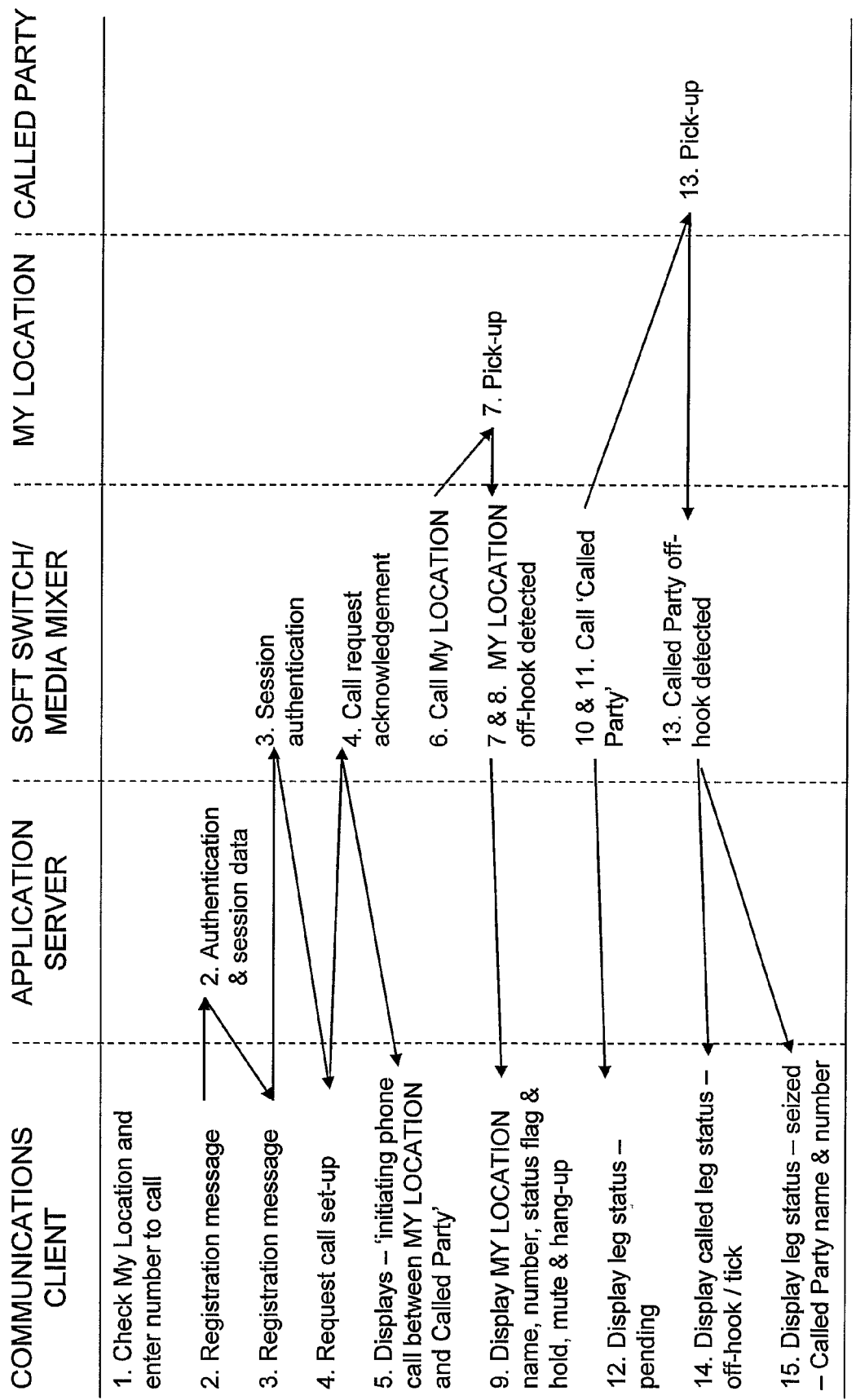
FIG. 5 is a graphical illustration of a call set-up message exchange and component activity for the telephone system illustrated in FIG. 4.

A basic call set-up procedure in accordance with an embodiment of the present invention will now be described with reference to FIG. 5.

This procedure makes use of the aforementioned SIP protocol, but it will be appreciated by those persons skilled in the art that alternative message protocols may be utilised without departing from the scope of the invention.

(1) Identification of the called/destination number and instructions to initiate the call can be done in a number of ways, preferably by one of the following methods: typing in the appropriate numbers to the relevant field of the communications client 54 followed by either a particular keystroke (such as 'Enter' on a PC keyboard) or clicking a 'Call' button in the communications client 54; selecting a telephone number from a list of numbers stored in a phonebook on the user device followed by either a particular keystroke (such as 'Enter' on a PC keyboard) or clicking the 'Call' button in the communications client 54; selecting a conference call listing in the Conference module and either clicking on the entry twice or selecting the entry and then clicking the 'Call' button in the communications client 54; or using functionality provided by a communications client module to highlight or select the desired number. Before instructing the communications client 54 to send the call initiation instruction, the user checks that the setting of the My Location module reflects the endpoint on which they wish to be called back as the first leg of the call.

(2) Once the user has selected their location and the number they wish to call, the client 54, sends a registration request to the application server 68. The application server 68 then verifies the credentials of the user and returns to the client 54 call authorisation along with details of the soft switch 66 to be used for the specific call.

(3) Once the telephone number has been inputted or selected and the client registered and authenticated via the application server, a Transmission Control Protocol (TCP) session is invoked by the communications client 54, for example via TCP port 8443, and a SIP registration message is transmitted to the soft switch 66 over a secure connection. The registration message includes the session specific user name and password for the user as allocated by the application server.

(4) Once authenticated and registered on the soft switch, the clinet 54 sends a call request to the soft switch to initiate the call. The soft switch 66 acknowledges the call request by sending a call request acknowledge message back to the communications client 54. An identity is assigned to the call.

(5) The communications client 54 responds to the call request acknowledge message by displaying a message to the user that a call is being initiated between the MY LOCATION endpoint and the called number.

(6) The Call Controller/Media Mixer 67 places a call to MY LOCATION to establish a call-back leg, from the CMC 62.

(7) In response to the endpoint at MY LOCATION ringing (or otherwise alerting the user) to indicate receipt of a call, the MY LOCATION endpoint is taken "off-hook" by the user, and an "off-hook" signal is sent to the Call Controller/Media Mixer 68.

(8) The soft switch 66 sends a MY LOCATION off-hook message to the communications client 54, to inform it of the off-hook condition.

(9) The communications client 54 responds to the MY LOCATION off-hook message by displaying the status of the call-back leg. Typically, the name allocated by the user to the MY LOCATION telephone number such as "work", "home" or "cell" is displayed (either with or without the actual telephone number) and a call active icon such as a tick. In a particularly useful embodiment, call control flags are displayed alongside information for each call leg, and which represent in-call functions such as MUTE, HOLD, and DROP for each leg of the call (it being understood that at this stage in the process only the call-back leg is active and as such information for only one call leg (the call back leg) is shown). Typically, these icons represent user actuable buttons, actuable by a point and click operation or other suitable behaviour to invoke the usual telephone functions associated with these terms for each leg of the call. For example, MUTE will cause audio from a muted call leg to be silenced, HOLD will put a call leg onto hold (and may replace the sound of conversation between the parties with another message, for example music), and DROP will drop the particular call leg with which the DROP button is associated.

(10) At substantially the same time or following shortly thereafter the soft switch 66 instructs the Call Controller/Media Mixer 61 to set up a call leg with the "called party"; and

(11) The Call Controller/Media Mixer 67 initiates a call to the "called party".

(12) The Soft Switch 66 sends a message to the communications client 54 indicating that a called party leg has been seized invoking the communications client 54 to display the called leg status as being seized. In the described embodiment this results in the called parties name and, for example, type of telephone number (such as 'work' or 'cell') being displayed to the user of the communications client 54. The called party leg ringing message received from the soft switch 66 causes the communications client 54 to invoke the display of the call leg status as pending. In the illustrated and described embodiment this results in a red ellipsis ( . . . ) being displayed adjacent the called party name and number.

(13) The called party's phone is taken "off-hook" and an off-hook signal is sent to the Call Controller/Media Mixer 67 which passes the call state information to the communications client 54 in real time.

(14) The communications client 54 responds to the called party leg off-hook message from the soft switch 66 by displaying the called leg status as being off-hook, which in the described embodiment is designated by a tick alongside the called party's name and number-type.

(15) The communications client 54 now displays the MY LOCATION name and number together with the fact that it is off-hook, the in-call control icons for MY LOCATION, and the called party telephone number and name together with the in-call control icons for the called party. The communications client user may control the in-call functions by actuating the icons displayed by the communications client 54, or may finish the call by replacing their handset on-hook. If the user selects the DROP icon a message is sent to the application server 68 which informs the Call Controller/Media Mixer 67 that the call initiator has stopped the call, and the Call Controller/Media Mixer 67 takes down both legs of the call. Optionally, if the Call Controller/Media Mixer 67 detects that the MY LOCATION handset has gone on-hook it also takes down both legs of the call.

In a particular embodiment, further parties may be added to an in progress call on an ad-hoc basis. The addition of a further one or more parties follows on from the basic call set-up procedure described with reference FIG. 5 above.

Figure 6:
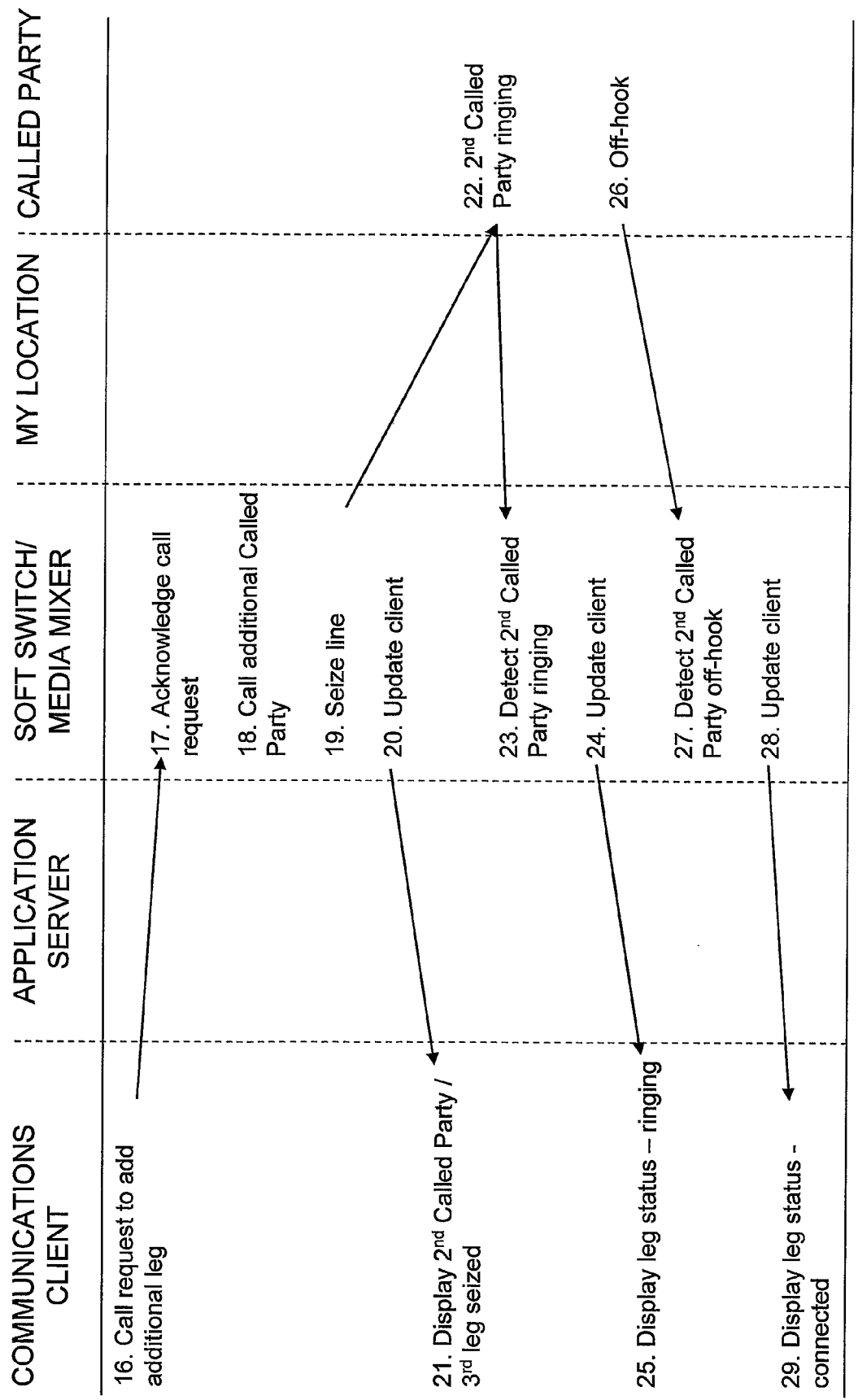
FIG. 6 is a graphical illustration of call set-up message exchange and component activity for adding a party to an ongoing call for the telephone system illustrated in FIG. 4.

Referring now to FIG. 6 of the drawings the addition of a further party to an in-progress call will now be described. The system state will carry on from the state described in FIG. 5 and consecutive state numbers will be used.

(16) The user, or called party if using a communications client 54, selects a second telephone number to be called (second called party) and invokes a second called party request message which is sent to the soft switch 66.

(17) The soft switch 66 acknowledges the second called party request; and

(18) instructs the Call Controller/Media Mixer 67 to place a call to the second called party.

(19) The Call Controller/Media Mixer 67 seizes a line in order to call the second called party, and informs the soft switch 66 that it has done so.

(20) The soft switch 66 sends a message to the communications client 54 informing that the second called party leg has been seized via SIP.

(21) The communications client 54 displays the status for the second called party indicating that it has been seized by displaying the name of the second called party. This has in fact established a third call leg.

(22) The second called party rings.

(23) The Call Controller/Media Mixer 67 detects that the second called party is ringing; and

(24) informs the soft switch 66 which sends a message to the communications client 54.

(25) The communications client 54 indicates that the second called party is pending by displaying a red ellipsis.

(26) The second called party goes off-hook.

(27) The Call Controller/Media Mixer 67 detects that the second called party has gone off-hook and informs the soft switch 66.

(28) The soft switch 66 sends a message indicating that the second called party has gone off-hook to the communications client 54.

(35) Communications client 54 displays the status of the second called party being connected with a tick. To add fourth and further ad-hoc parties to the in-progress call states 22 to 35 are repeated as often as necessary.

As aforementioned, in the described embodiment call leg in-call control icons are displayed for each call leg, thereby allowing the initiator of the calls to actuate the appropriate icon in order to put an associated leg on HOLD, MUTE or indeed to DROP that leg.

When the user wishes to control an existing leg or introduce a new leg to the call, the continuous SIP dialogue enables the user to enact this command in real-time by actuating the communications client 54 as desired. For example, if the user wishes to place a leg of the call on hold, then they actuate the HOLD button next to the identity of the relevant leg in a display screen of the communications client 54. The communications client 54 sends the HOLD instruction via the SIP dialogue directly to the soft switch, where the soft switch acts on the instruction by placing the relevant party on hold within the Mixer 66. The soft switch then returns the status of that leg to the communications client 54 through the SIP dialogue. The communications client 54 receives the message and updates the real-time display to show that the relevant party is now on hold.

When a call is terminated, the Soft Switch 66 notifies the Application Server 68 of the call detail records (CDRs) for retention, processing and presentation as part of the user's call records, and for billing purposes. The Application Server then processes the CDRs in the manner required for the desired service, preferably rating and billing the call, and including the call as part of the call history displayed to the user through the Web Server.

The described embodiment of the invention implements the communications client 54 as a Windows® application. The communications client 54 may be displayed as a full user interface, or collapsed to run as a background function in the System Tray. In Windows 95/98 and XP for example, the System Tray is an area on the right-had side of the task bar which displays icons that are representative of software programs which have a persistent memory resident component (and hence are running in the background). Typically such memory resident programs comprise functions such as the volume control and Instant Messenger, and are invoked on start¬ up of the computer system.

Embodiments of the communications client user interface will now be described with reference to FIGS. 7 and 8 of the drawings.

Figures 7, 8:
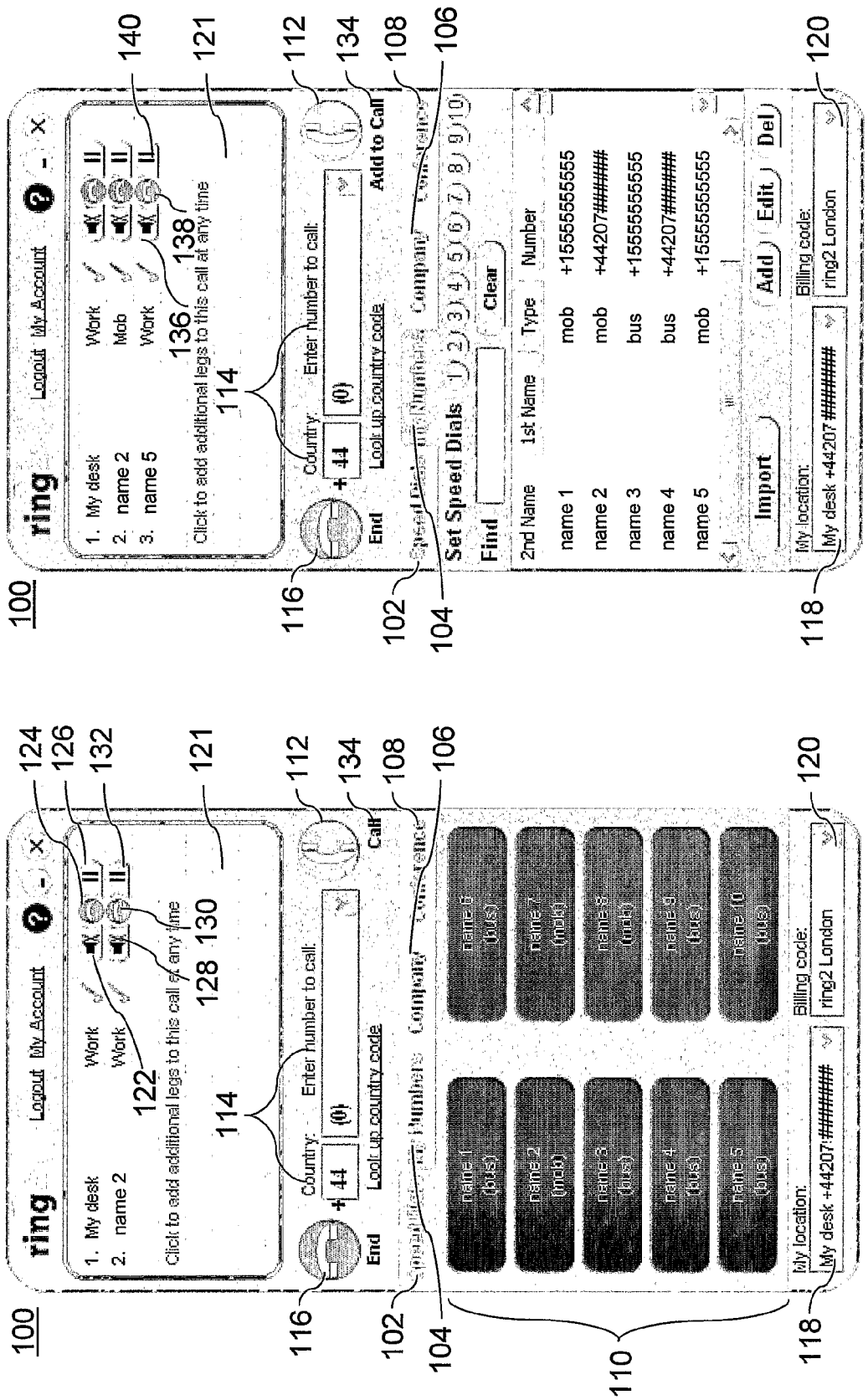
FIG. 7 is an example of a communications client user interface for "quick dial" keys in accordance with an embodiment of the present invention.
FIG. 8 is an example of a communications client user interface for an address book in accordance with an embodiment of the present invention.

FIGS. 7 and 8 of the drawings illustrate a user interface 100 for the communications client 54 in accordance with the described embodiment of the present invention. There are 3 main aspects to the user interface 100; namely, number management, making and ending a call and displaying call status. The user interface 100 has three user actuable tabs for displaying number information. A favourites tab 102 which displays 10 quick dial buttons user actuable, for example by point and click, to make a call to the selected telephone number. A personal address book tab (my numbers) 104 which displays a list of names and telephone numbers such as may be found in a conventional address book, and a business address book (company) under tab 106. Tab 108 (conference) is an interface for setting up and managing scheduled conference calls.

FIG. 7 illustrates the communications client display interface having the favourites tab 102 active, displaying the quick dial telephone numbers 110 user actuable by double clicking, or selectable by a single click and activation of the call button 112. Optionally, a telephone number may be entered in the country code and number text windows 114. A call end button 116 is also provided.

Text window 118 displays the MY LOCATION telephone number, and is editable to change the MY LOCATION number. A cost or project code can also be entered into text window 120, which will be communicated to the soft switch and application server 68 for recording the cost of any call or calls against that cost or project code. The communications client user interface also includes a call display status window 121.

When a user wishes to invoke a call they can select the number from one of the quick dial buttons 110 or enter the number into the text window 114. Once a call has been initiated then the call set-up procedure as described in FIG. 5 is invoked. The MY LOCATION name (in this case My desk) is displayed in the status window 121 together with a tick indicating that the call leg is active and call control icons for MUTE 122, DROP 124 and HOLD 126. When the called party (name 2) is connected then the display status window 121 displays the called party's name and status indicating that it is connected, hi the called party's displayed line, there is also a string of icons 128, 130 and 132 respectively corresponding to MUTE, DROP and HOLD for the called party leg of the call. By activating one or more of the call control icons 122, 124, 126, 128, 130 and 132 the user, as initiator of the calls, is able to put one or more of the called legs on MUTE, HOLD and DROP.

Referring now to FIG. 8 a user interface 100 for the communications client 54 is displayed in which the address book tab 104 (My Numbers) is active. The address book tab 104 may be used to initiate all calls or may be opened following a call initiated using either text window 114 input or quick dial numbers 110 from the favourites tab 102 as described with reference to FIG. 7.

In the described scenario, a user has set up a first call as described with reference to FIG. 7. They now wish to add a further person to the call (ad-hoc conferencing) and do so by selecting the desired called party (name 5) from a list of telephone numbers under the address book tab 104. Optionally, they could have added another party from the quick dial numbers 110 under the favourites tab 102, or by inputting a telephone number into the text window 114. To add the selected party to the call the "add to call" button 112 is actuated. The "call" button 112 automatically changes its description 134 from "call" to "add to call" once a first call leg has been established. Once the "add to call" button has been activated then the second called party call set-up procedure is invoked as described with reference to FIG. 6.

Once the call leg to called party (name 5) has been established then the full status is displayed in display window 121, namely the name of the called party (name 5), the call active "tick" and the call control icons MUTE, DROP and HOLD 136, 138 and 140 respectively.

The user, who is the call initiator in this scenario, is able to control the third leg of the call to MUTE, DROP and/or HOLD that leg.

It will be evident to a person of ordinary skill in the art that the particular interface 100 described herein is not the only way to implement the communications client functions and various other configurations and forms of interface may be used. In particular, for devices having small area displays, for example portable or handheld devices such as PDAs and cellular telephones, for example, a simplified user interface would be appropriate.

As mentioned above, in the described embodiment the communications client 54 resides in a Windows® operating environment, and comprises a persistent memory-resident portion (represented by an icon in the aforementioned system tray) even when the communications client's main user interface window has been closed down. This arrangement is advantageous as it allows the communications client 54 to be invoked as required without having to restart the communications client on each occasion that a user desires to make a call. A further advantage of this arrangement is that the client can be invoked and an end-point called merely by highlighting a data entry containing telephone numbers in any application for example an-email or a Word document.

Figure 9:
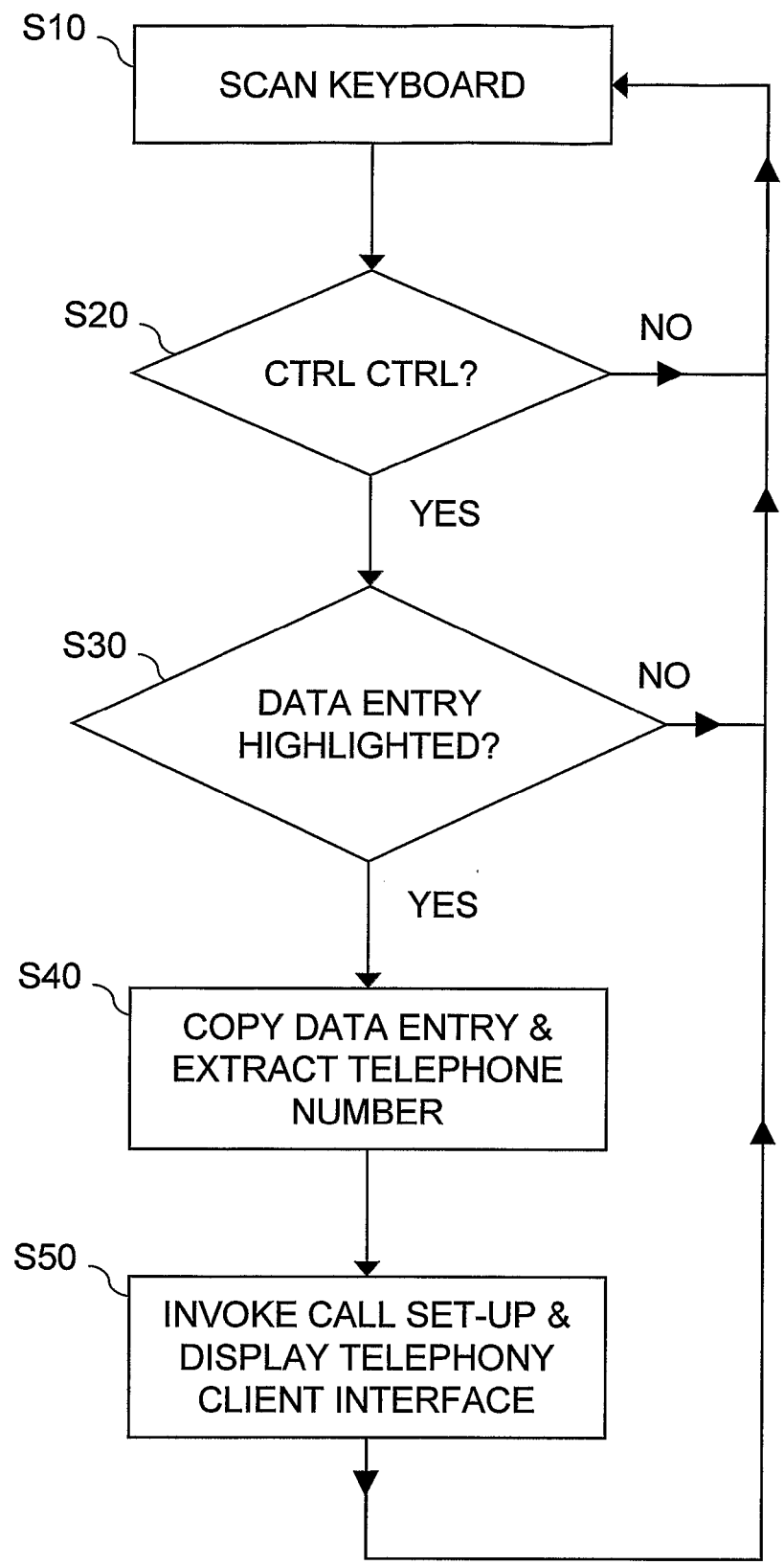
FIG. 9 is a flow diagram for an embodiment of a communications client in accordance with the present invention.

A process flow diagram for this aspect of the communications client 54 is illustrated in FIG. 9 where at step S10 the communications client 54 scans the keyboard of the data processing apparatus upon which it resides. The communications client 54 reviews keyboard scans at step 20 to determine, in this particular example, if the control key has been depressed twice in quick succession, for example the second press occurring within 2 seconds of the first. If no "control-control" key sequence has been detected then the communications client returns to step S10 where it continues to scan the keyboard. If a control-control sequence has been detected then process control flows to step S30 where the communications client 54 determines if a data entry has been highlighted for any running application. If no data entry has been highlighted then process control flows back to step S10, otherwise control flows to step S40 where a copy of the data entry is taken and the telephone number extracted from it.

At step S50 the communications client 54 invokes a call as described above with reference to FIG. 5 or 6, and displays the communications client interface providing the user with control of a call.

Processing control then flows back to Step S10 where the keyboard scan continues and further telephone numbers may be called and added to the call to achieve ad-hoc conferencing by highlighting data containing the new numbers and pressing the control key twice in quick succession.

In this manner, the communications client provides for the extraction of a telephone number from any textual application (for example Word, or textual acrobat files) to invoke a call to one or more parties.

In a particular embodiment of the present invention, a user may set-up a scheduled conference call provisioned and managed by the application server and call management centre 62. The conference call may be scheduled by way of the communications client 54.

Figure 10A:
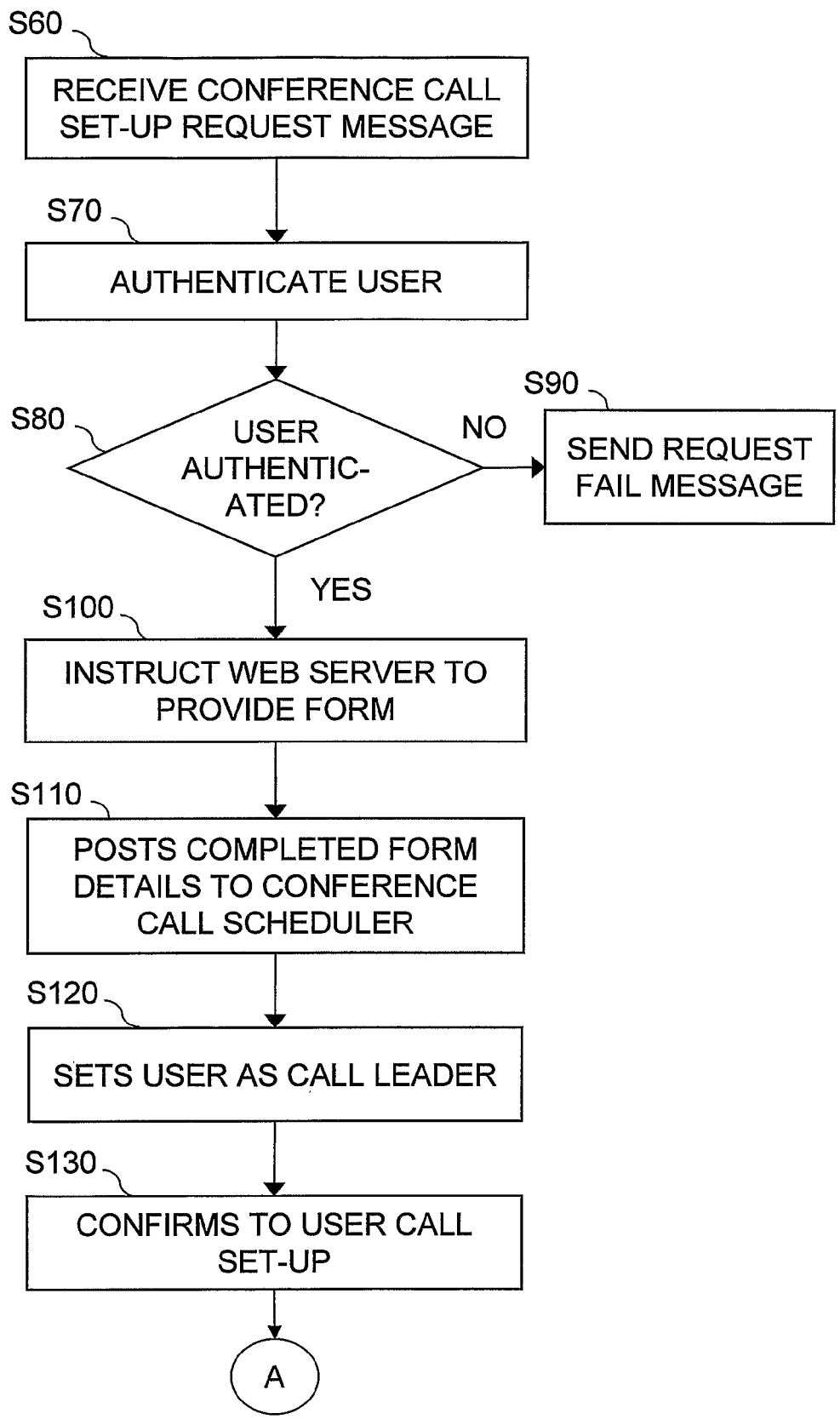
FIGS. 10a and 10b are process flow diagrams of a conference call set-up process.
Figure 10B:
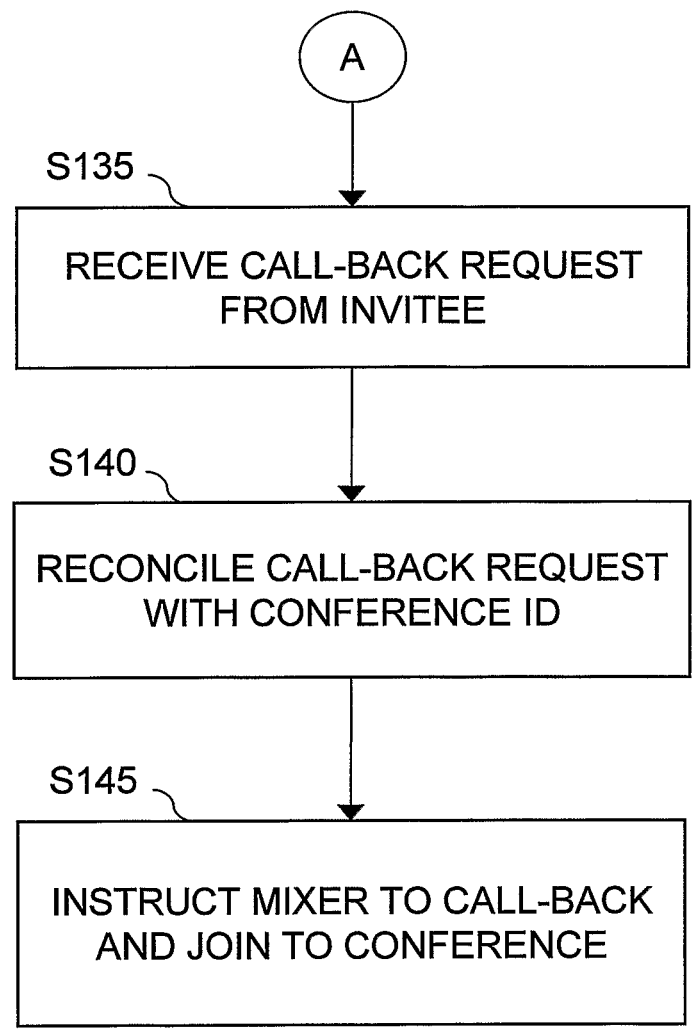

Referring now to the process flow diagrams of FIGS. 10*a* and 10*b* application server 68 receives a conference call set-up request message, step S60, via web server 92. The conference call set-up request message may originate from a communications client 54, in which case the user name and password for the client are automatically included in the message, or via a web site in which a user has to input their user name and password, for authentication by the application server. The application server 68 invokes authentication of the request message at step S70, during which the user name and password are checked using the provisioning module 88 to verify that the user name and password combination are active. At step S80 if the user authentication fails then process control flows to step S90 in which the application server initiates sending a request fail message to the user. If the user is authenticated then process control flows to step 100 and the application server 68 instructs the web server 92 to provide a conference call set-up form 200 as illustrated in FIG. 13a and continued on FIG. 13b.

Schedule new conference form 200 may reside on a web server 92 and be completed by a user over the Internet 22 by way of an Internet protocol session, or directly in a Window managed by the communication client 54 and subsequently posted to the application server via the web server.

Referring to the form 200 illustrated in FIG. 13 it can be seen that various details regarding the conference call are requested. Much of the information requested is self evident from the legends accompanying the space for providing the information, and consequently only the key data shall be described. A title 210 for the conference call is required in order that invitees and the user may discriminate between various conference calls that may be set-up and displayed to them via their communications client, or communicated to them via e-mail. The date, 212, and start time, 214, may be provided, and the time zone 216 set as desired. The call duration 218 may also be input, and in the described embodiment as a default setting of 30 minutes. Optionally, a Simple Message Service (SMS) reminder may be requested, 220, and the telephone number to which the SMS reminder is to be sent input, 222.

The e-mail addresses of each of the invitees is input in box 224, and a message 226 may also be included in the e-mail invitation. Optionally, attachments 228 may be made to the form 200. Optionally, the conference call must have the leader present, 230 in order for the conference call to be active.

Figure 14:
FIG. 14 is a schematic representation of conference call set-up message provided to a designated leader of the conference call.
Figure 15:
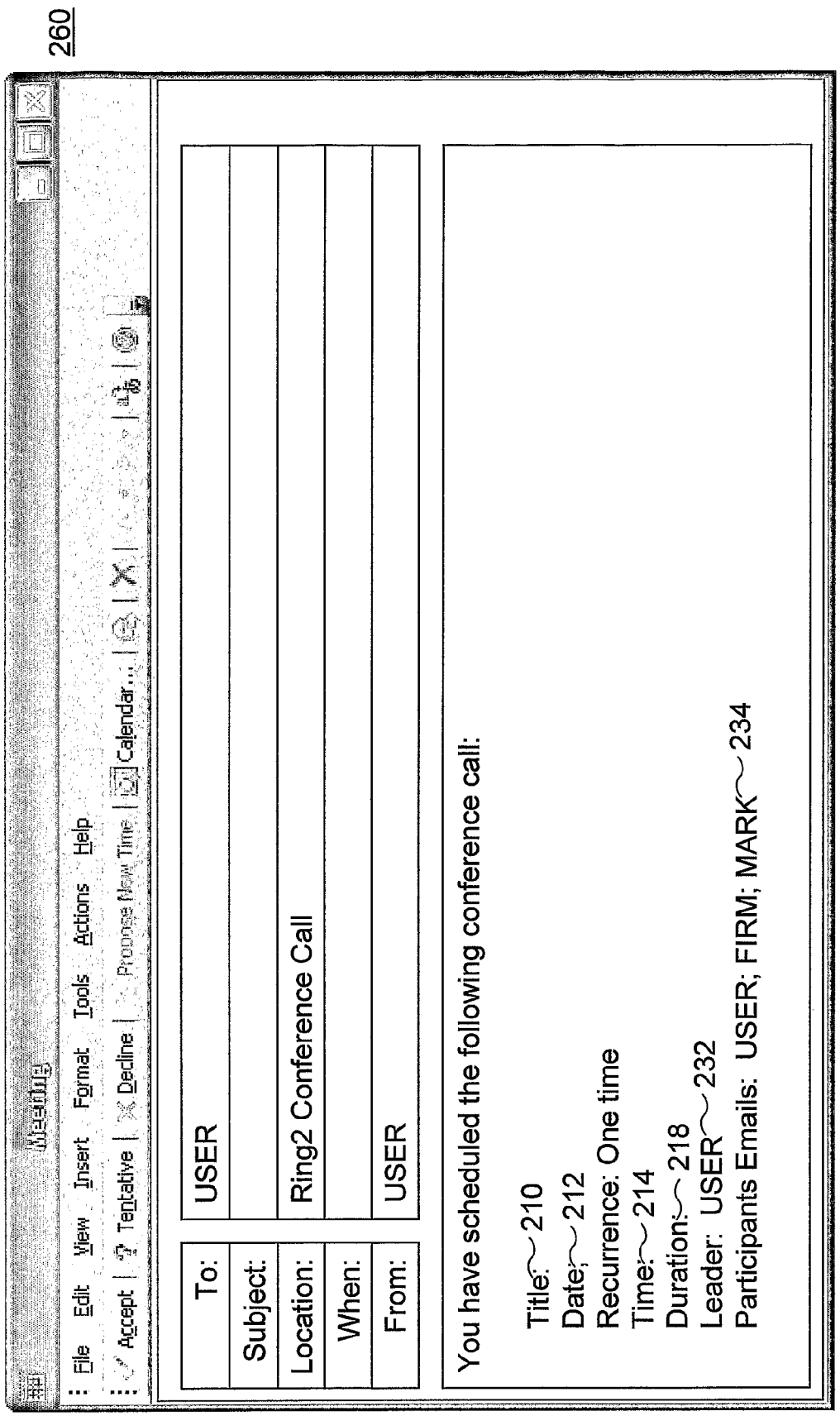
FIG. 15 is a schematic representation of a leader's electronic diary entry, in this instance an outlook attachment.
Figure 16:
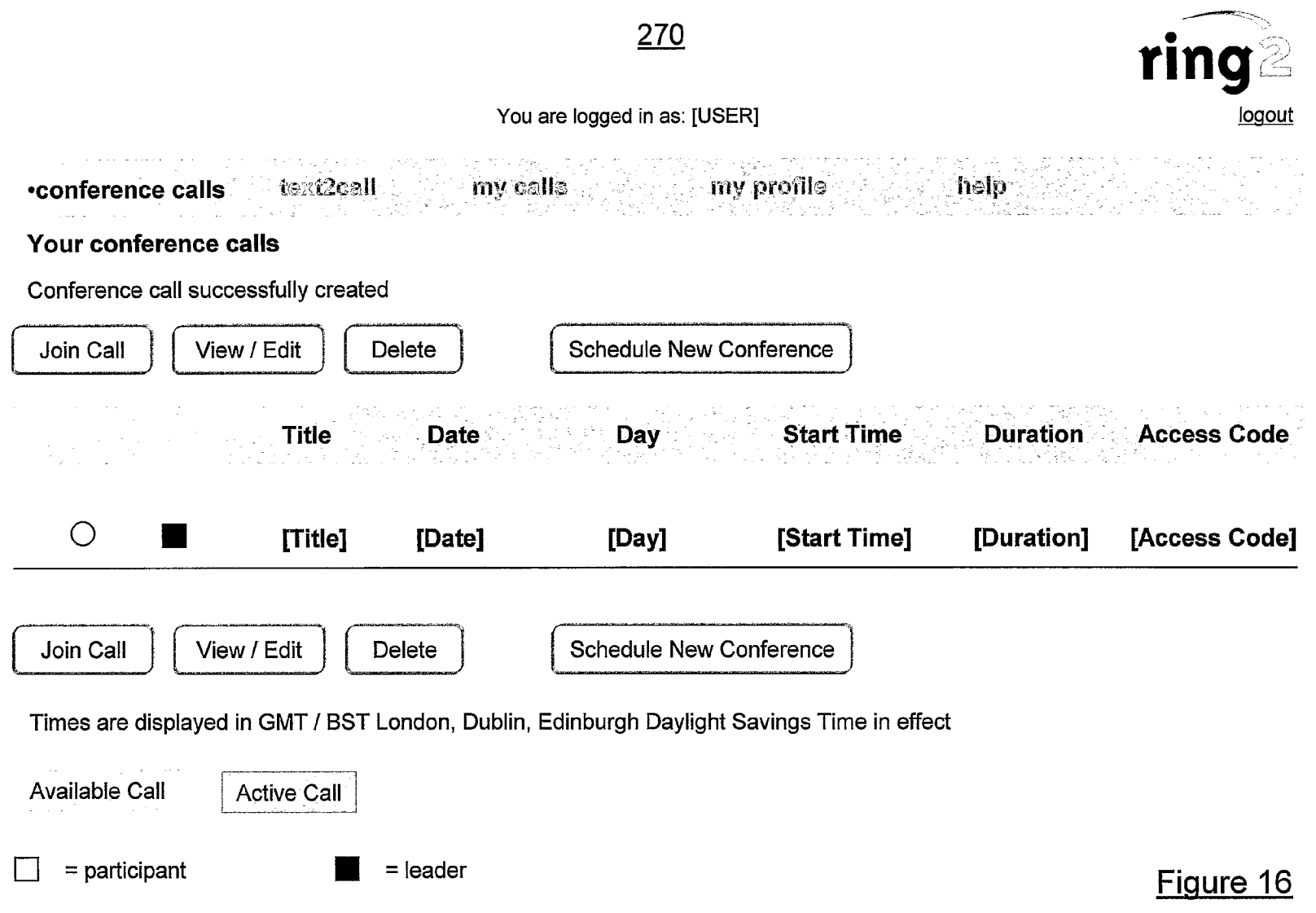

At step S110 the completed form is forwarded by the web server 92, and the application server 68 posts the completed form details to the conference call scheduler 86. As shown in FIG. 16, the web server also displays a web page 270 with the inputted conference call details to the leader for verification purposes. In the described embodiment, the application server 68 sets the user (new conference call originator) as the call leader, S120, and sends a secure message to the communications client 54 to confirm to the user that the conference call has been set up, S130. The conference call set-up is confirmed by way of an e-mail 250 (illustrated in FIG. 14) which includes the title 210, date 212, time 214 and duration 218. The leader 232 (in this instance "user") is identified, together with the other proposed conference call participants 234. The conference call invitation e-mail 250 has attached to it a vCalender file (VCS) which, upon opening, populates the leader's VCS compatible calendar with the conference call details including the date and time as well as the access numbers and codes (not shown). An example of a VCS compatible calendar program is Microsoft Outlook.

The confirmation e-mail 250 provides the option of e-mailing all participants in order to provide them with further information about the call for example, 236. Access details for the conference call are also provided, 238. Form 250 also provides the option for requesting a SMS reminder, 240, actuation of which invokes a web page via which the telephone number of the telephone, typically a cellular telephone, at which the SMS reminder has been received may be input.

Figure 11:
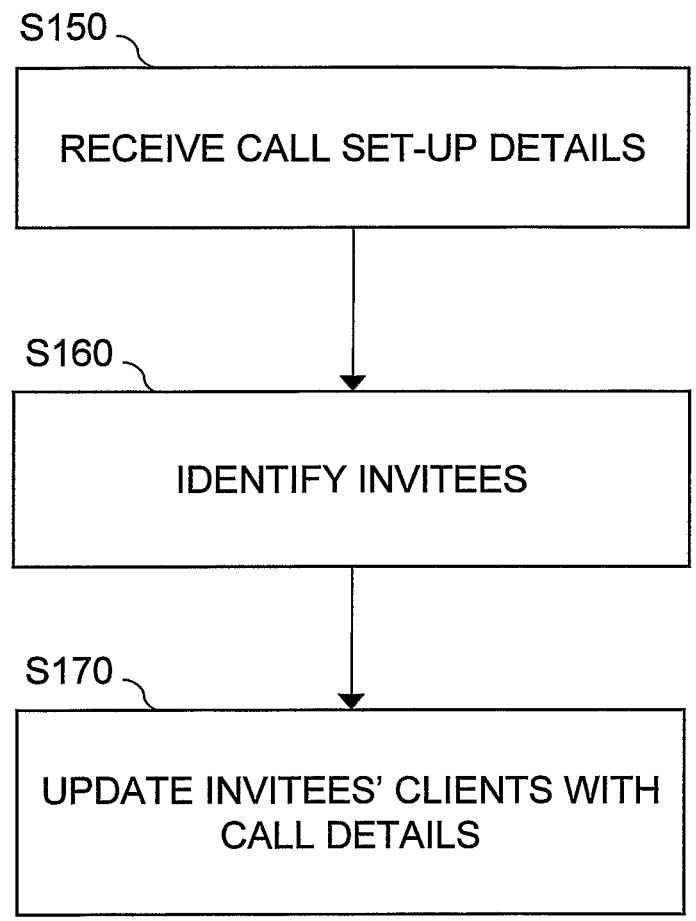
FIGS. 11 and 12 are schematic process flow diagrams for various aspects of the conference call set-up process.

Various other call set-up processes are initiated and managed by the application server 68 in order to notify the conference call invitees and to schedule the conference call within the call management centre 62 system. These processes will be described in detail with reference to FIGS. 11 and 12 of the drawings. So far as the next external communication is concerned, the process control flow proceeds to step S 135 where a call-back request is received from an invitee or the user. At step S140 the call-back request is reconciled with a conference identity, and at step 145 the application server 68' instructs the Call Controller/Media Mixer 67 to call the requesting invitee or user and join them to the conference call.

Conference call scheduling is provided by module 86 of the call management services 64, and receives call set-up details, S150, from the application server 68. Invitees provisioned as users within the system are identified by their e-mail address (S160) and the application server updates the invitees client with details of the conference call, S170, and a link from which the call can be joined when the call becomes available.

Figure 12:
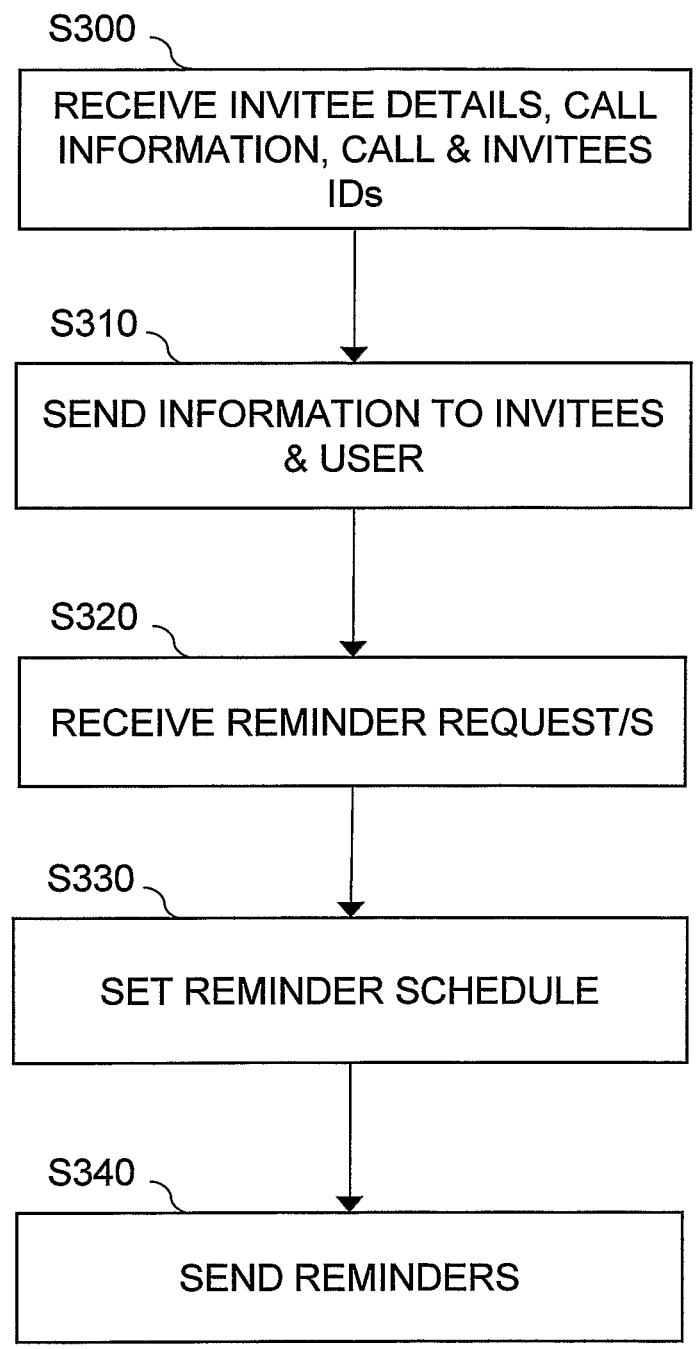
Figure 17:
FIG. 17 is a schematic representation of an invitation to a conference call provided to an invitee.
Figure 18:
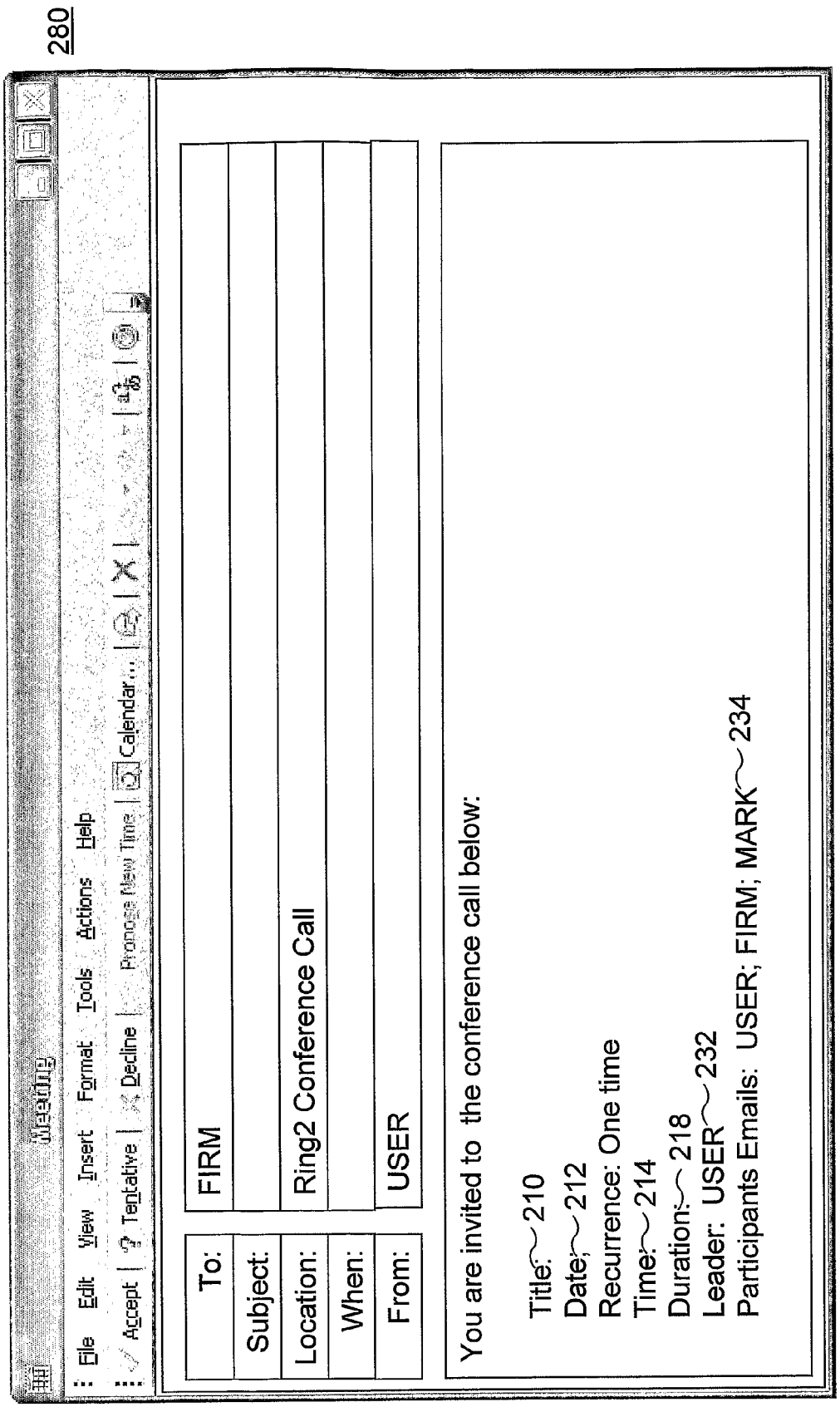
FIG. 18 is a schematic representation of an invitee's electronic diary entry, in this instance an outlook attachment.
Figure 19:
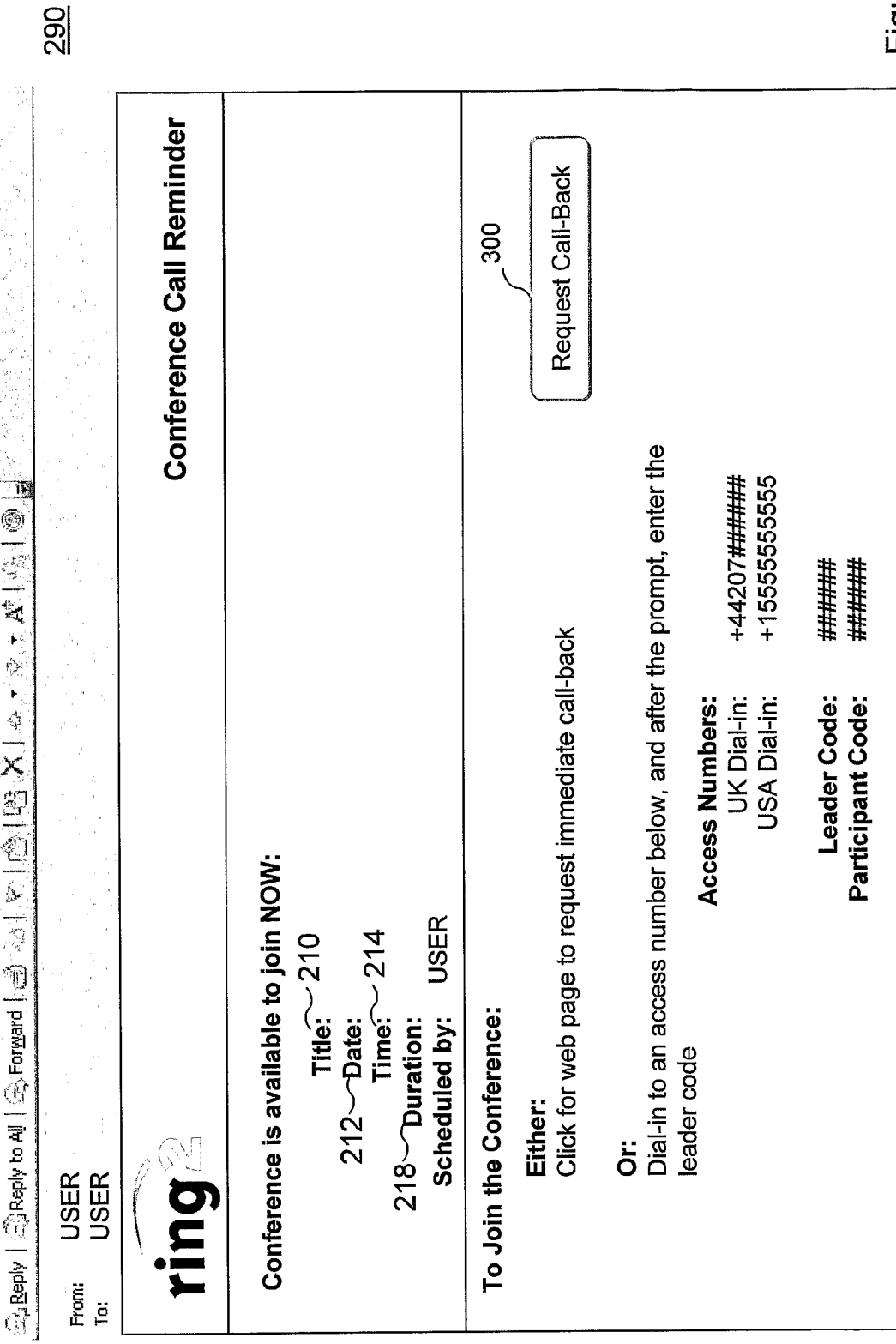
FIG. 19 is a schematic representation of a conference call reminder.
Figure 20:
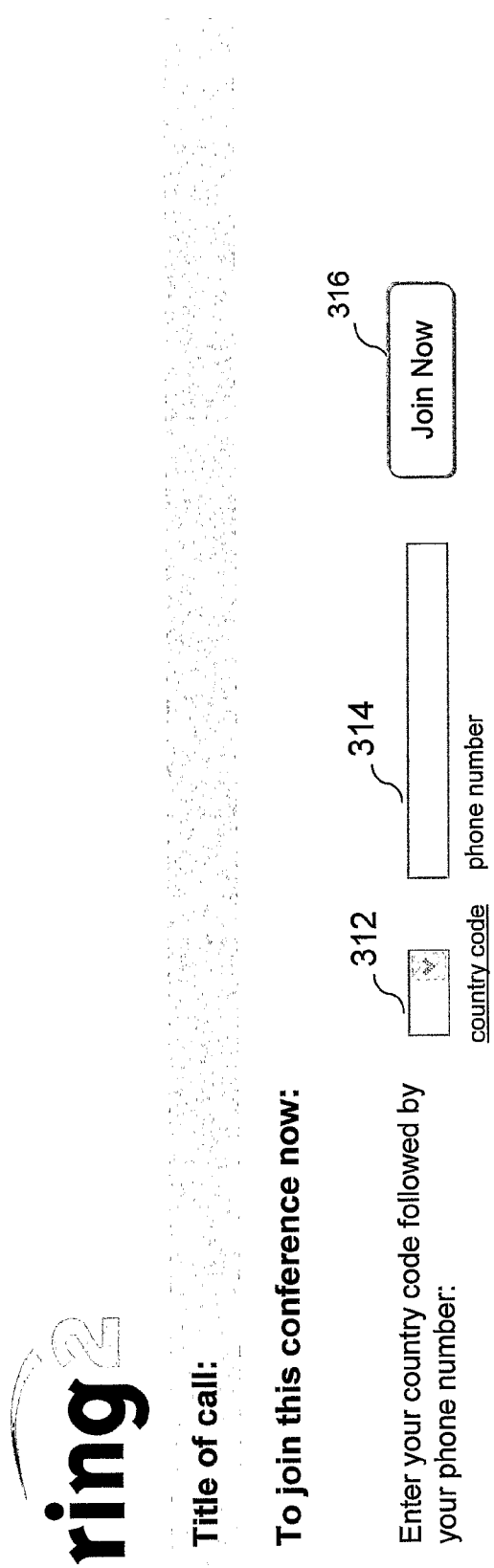
FIG. 20 is a schematic representation of a request call-back web page.

Referring now to FIG. 12, operation of the notification services module 84 following the invocation of the scheduling of the new conference call will now be described. The notification services module 84 receives invitee details, call information and call and invitees' identities, together with the user identity from the conference call scheduler 86, at step S300. Invitations to the conference call are then sent out to the invitees and the user at step S310. An example of a conference call invitation 275 to an invitee is illustrated in FIG. 17 of the drawings. In the illustrated example the e-mail invitation is sent to the invitee and provides the telephone numbers and codes for joining the telephone conference and an option setting an SMS reminder 240 for the call. The conference call invitation e-mail 275 has attached to it a vCalender file (VCS) 280 (depicted in FIG. 18) for populating a recipient's VCS compatible calendar (e.g. Microsoft Outlook) with the conference call details including the date and time as well as the access numbers and codes (not shown). At step S320 the application server receives any SMS reminder requests via invitee input on a web page generated by the web server 92. Process control flows to step S330 where a reminder schedule is set within the application server for e-mail (all invitees) as well as any SMS reminders (for those invitees who chose this option). An example of a conference call reminder 290 is illustrated in FIG. 19. The illustrated conference call reminder 290 is the one sent to the user, i.e. initiator of the conference call, however, conference call reminders sent to other invitees will have similar information and format. Notably, the reminder includes a request call-back button 300. Actuation of the request call-back button 300 invokes a web page 310, an example of which is illustrated in FIG. 20. Text boxes 312 and 314 are provided for inputting the telephone number country code and telephone number respectively other telephone at which the user wishes to be called back. Activation of the join now user actuable key 316 results in a call-back request being forwarded to the call management centre, where the soft switch 66 is instructed to call-back the user at the input telephone number as described with reference to steps S135, S140 and S145 of the flow diagram of FIG. 10.

A similar conference call reminder goes to the invitees also, who may respond by requesting a call-back or use the access numbers or participation codes provided in the conference call reminder 290 to dial in and access the conference.

Figure 21A:
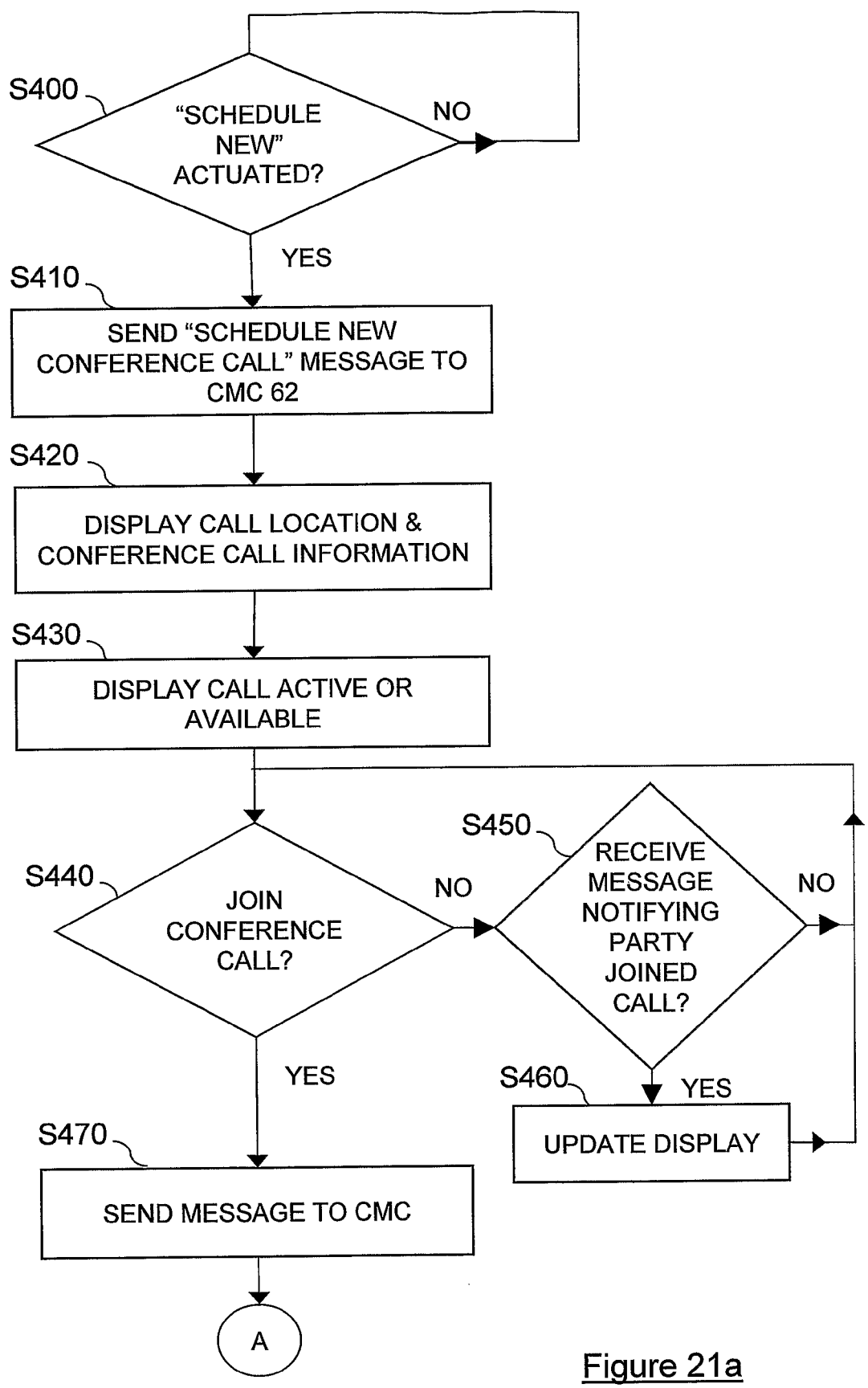
FIG. 21 is a process flow diagram for operation of a communications client.
Figure 21B:
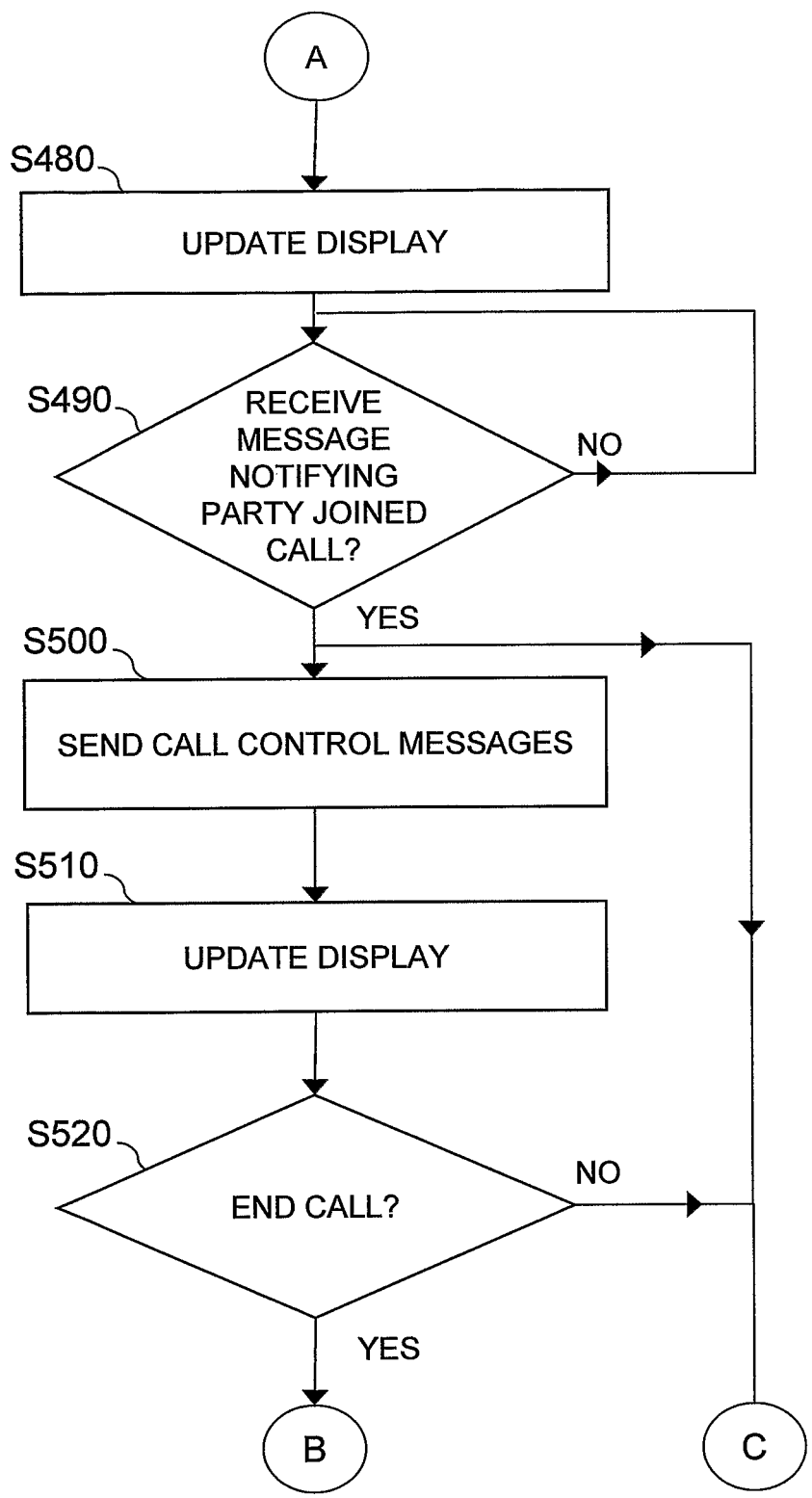
Figure 21C:
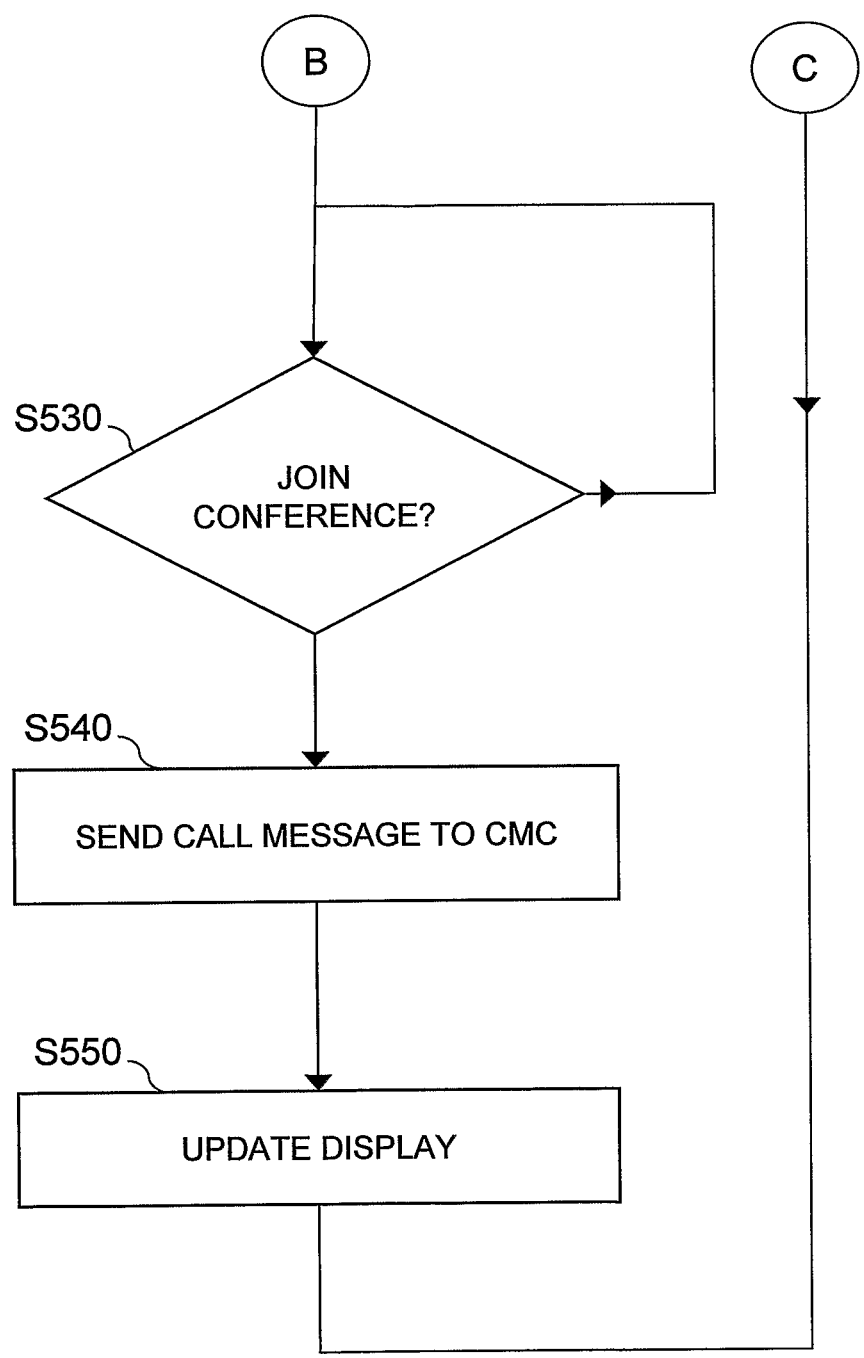
Figure 22:
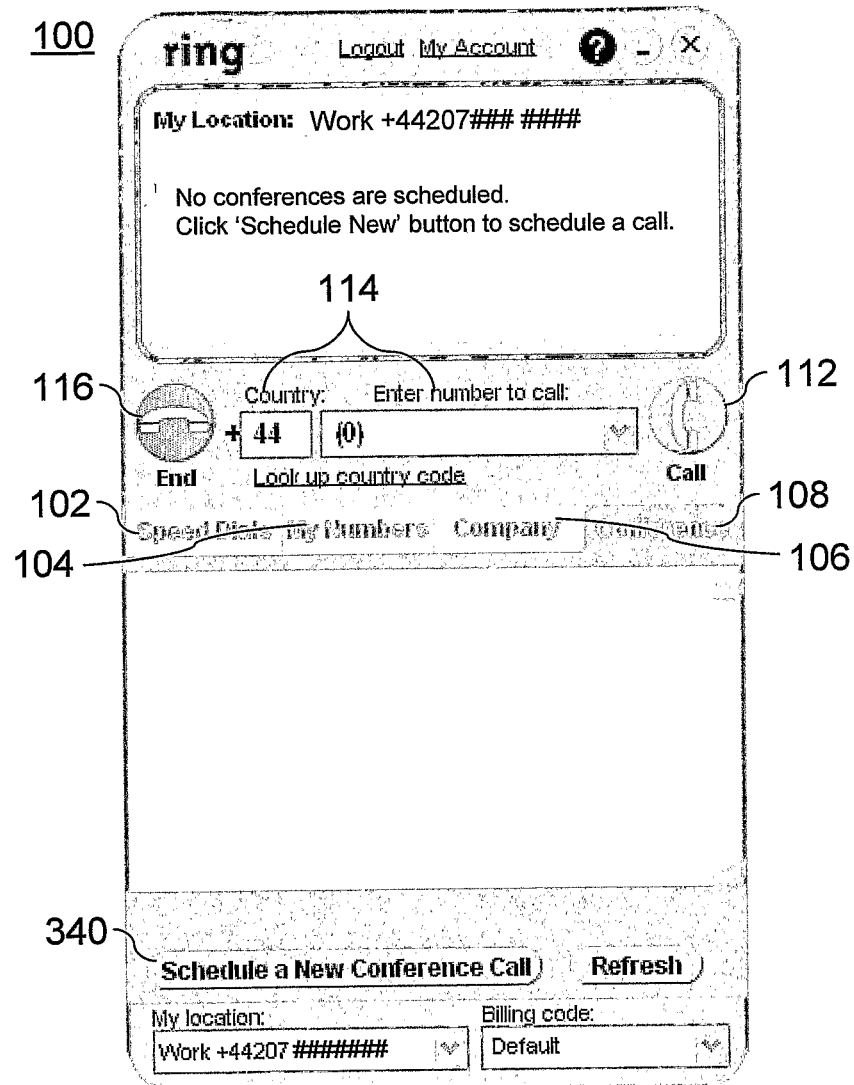
FIGS. 22, 23 and 24 are schematic representations of a communications client interface.
Figure 24:
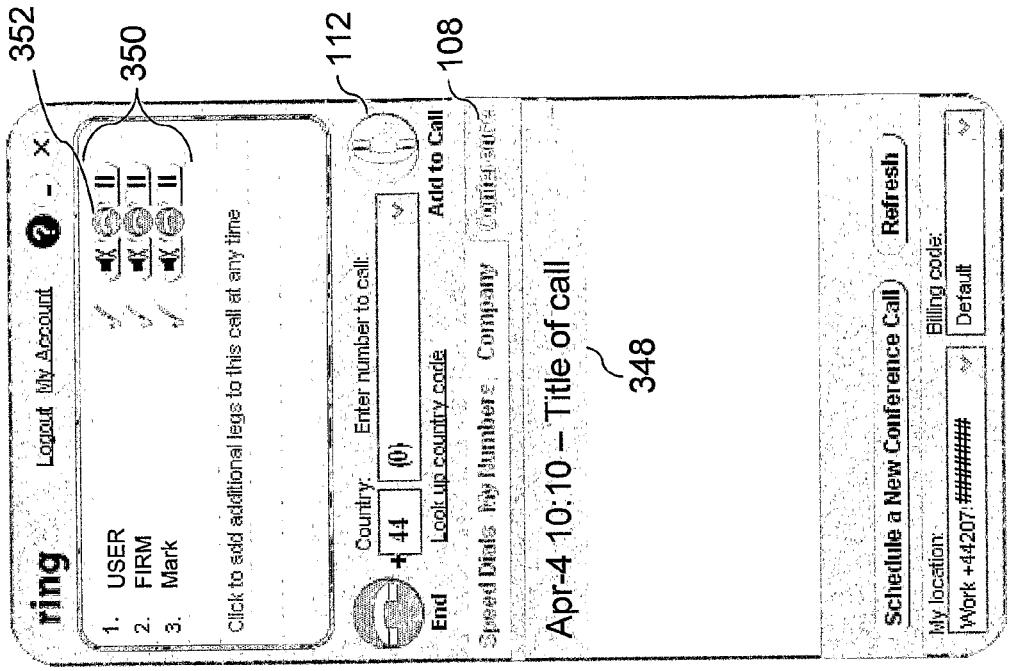
Figure 23:
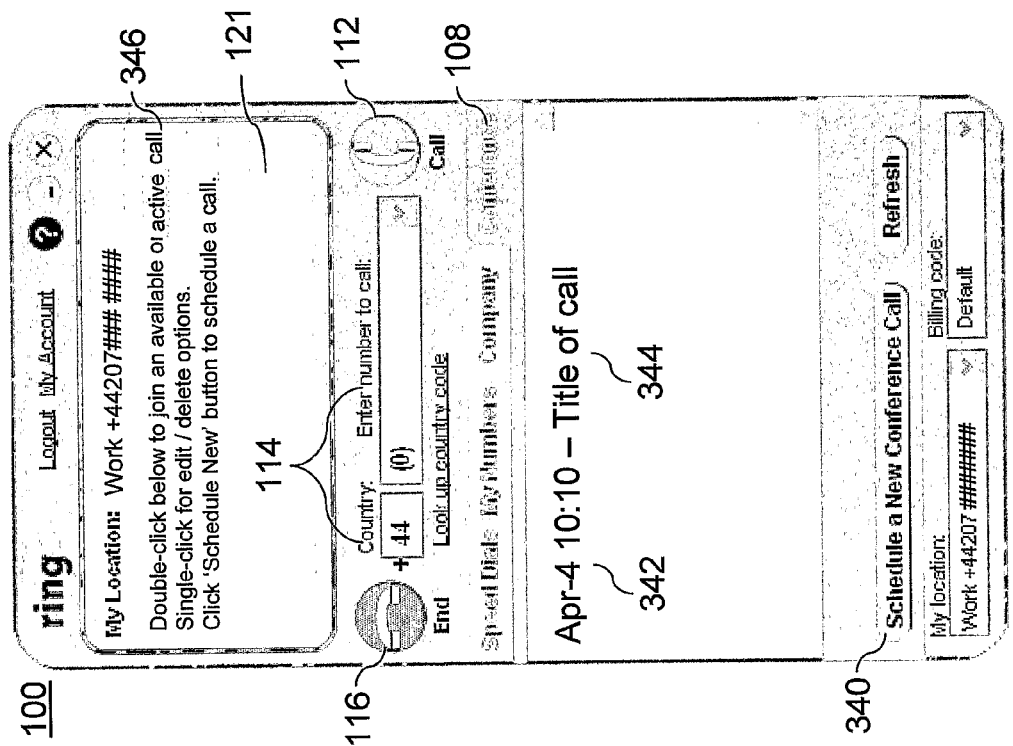

Operation of the communications client 54 will now be described with reference to the flow diagram of FIG. 21 and illustrative embodiments of the communications client 54 user interface illustrated in FIGS. 22, 23 and 24. A user activates tab 108 (conference) which results in the user interface 100 illustrated at FIG. 22. Referring now to FIG. 21, at step S400 the communications client 54 a new conference call has been scheduled by monitoring for actuation of the "schedule new" button 340. If button 340 has been actuated then process control flows to step S410 in which a message requesting scheduling of a new conference call causes the web server to post a call scheduling web form to the browser of the user. Once the call scheduling data is entered in the web form and submitted, the web server posts the scheduled call details to the application server. The next time that the client logs into the application server, invitees provisioned as users within the system are identified by their email address and the application server updates the invitee's client with details of the conference call and a link from which the call can be joined when the call becomes available. Additionally, in display 121 instructions for joining a call 346 are provided. At step S430 a call active or available is displayed. If a call is available to join then the words "available" are highlighted with the same colour as the available conference call. Alternatively, if a conference call is active the word "active" is highlighted with the same colour as that highlighting the active conference call, typically the colours for available and active calls being different from each other.

In general terms, ten minutes before the scheduled start date and time of the conference call, the application server sets a flag that the conference call is now available to join, as a result, the next time that the invitee's clients log into the application server, the status of the conference link is updated, indicated to the invitee by shading the call link, and the link is activated such that double-clicking on the link posts a request to the application server to instruct the Softswitch to initiate a call to the invitee's 'my location' so that the invitee can join the call. This also has the effect of opening a SIP session between the client and the soft switch so that the client can display real time information about the participants on the call and give the user the ability to add or manage different legs. The user who scheduled the call has M1 control over every leg on the call whereas invitees can see all the legs on the call but can only give instructions for their leg or any additional legs that they have added to the call. Once an invitee has joined a call, the application flags the call as active and upon the next client login to the application server the status is updated to indicate that the call is now in progress. This is indicated to the invitee by a different shading of the conference call in the conference call tab.

Referring back to FIG. 21, at step S440 the communications client 54 monitors whether or not a request has been made to join the conference call. If no such request has been made the process flow control moves to step S450 where the communications client determines whether or not a message has been received notifying that a party has joined the call. If no such message has been received then process flow control returns step S440. However, if the communications client 54 has received a message notifying that the party has joined the call then the display is updated at step S460 with the details of the party having joined the call. An example of user interface 100 illustrating parties having joined the call is illustrated in FIG. 24 where the name of the parties on the call are displayed, together with a call active icon and the call control icons.

If the communications client 54 determines that a request to join the call has been made at step S440 then process flow proceeds to step S470 where a message is sent to the call management centre 62 requesting joining to the call.

Process flow control then proceeds to step 480 where the communications client display is updated to show that the user has joined the call. The communications client 54 then continues to monitor to see whether or not any further message has been received notifying that further parties have joined the call at step S490 and if they have updates the display accordingly.

Once there is at least one participant in a conference call the call becomes active, and the active conference call highlighted 348. Throughout the conference call additional parties (legs) may be added to the call in accordance with the procedure described with reference to FIG. 6 of the drawings (ad-hoc conferencing).

Throughout the conference call the leader, who is the user, may activation call control icons 350 to send call control messages, S 500, to the call management centre 62, and at step S510 updates the display accordingly.

If the user decides to end the call, then they activate the end call icon 352 in line with their name, step S520. This drops the user from the conference call. However, the conference call may continue without the user. The user interface 100 will display the active call participants and also indicate that the user is no longer active on the call. However, the user may rejoin the conference call, step S530, by doubling clicking on the conference call in the conference tab section 108. Activation of the highlighted conference call 348 will result in a message being sent to the call management centre 62, 5540, by the communications client 68 requesting the joining to the conference call. A user leg is set up by the soft switch 66 to join the user to the conference call and the communications client 54 updates its display, 5550, to indicate that the user leg is now active.

Other conference call participants may also drop from a call and re-join at a later stage.

If a call invitee is running a communications client 54 then that communications client will also display a user interface 100 similar to that described for the user. That is to say, the invitee will join the conference, and be capable of re¬ joining the conference, in the same way as described for the user and their display will display the same information.

Each participant running a communications client 54 may add further parties to the call. The ad-hoc addition of parties to the conference call may be carried out in accordance with the process described with reference to FIG. 6 of the drawings.

If a user (leader) adds a party to the call then the leader has control over the call functions, namely muting, dropping and holding that call leg. However, if a conference participant other than the leader adds a party to the conference then that participant and the leader have control over in call functions mute, drop call or hold for that leg.

It will be appreciated from the foregoing that these arrangements provide an effective means to implement call control and conference calling from a desktop application. It is also the case, however, that the advantages proffered by such a system are not limited solely to desktop applications but can additionally be implemented in any environment where a terminal with data access can be used to pass information to the CMC to facilitate calling, call control, conferencing, etc. One example of such an implementation would be a mobile phone, others include devices such as internet enabled PDAs, PDA mobile phones, VoIP handsets, etc.

As aforementioned, one particular problem facing users of mobile terminals is that calls placed from the terminals are significantly more expensive than calls placed from landline terminals. The aforementioned propensity of cellular phone users to use their mobile terminals in preference to their landline terminals (even where landline terminals are readily available) often leads to increased telephony expenses either for the business, or for the user in their personal capacity.

Currently the only way to circumvent expensive mobile telephony charges is for the mobile terminal user to dial a predetermined access number (for a given low-cost service provider), and then manually key in the number that they wish to be connected to. This is inconvenient for the user, in first instance because the user has to key in two sets of numbers (and typically also an access code), and in the second instance because numbers tend to be associated with listings of names in mobile terminal address books and as such the user must first find out what number is associated with a given name before invoking the call to the low-cost service provider.

A further problem facing mobile terminal users in particular is that whilst it is currently possible to participate in a conference call with a mobile terminal it is difficult, if not impossible, to instigate full conference calling from a mobile terminal.

By providing mobile terminals with a software client such as that described above (albeit on a reduced visual scale appropriate for the limited viewing capabilities of a mobile terminal) it is possible—as will now be described—to mitigate the aforementioned problems, and to provide additional functionality of use to the user.

In general terms, this embodiment of the invention relates to a software communications client, embodied for example as a Java applet, which can be locally executed on a mobile terminal, for example a GSM or UMTS telephone or cellular PDA. The client provides three generic functions: (1) it enables a user of the terminal to place a call to one or more called party identifiers (such as one or more other mobile telephones or a landline) via the Ring2 call network, and thereby avoid the relatively large call charges that are typically associated with traditional mobile networks; (2) it enables a user to schedule a conference call from their mobile terminal; and (3) it enables the user to use a mobile terminal as a conference call controller for an ongoing conference call, for example one that the user is participating in.

Figure 25:
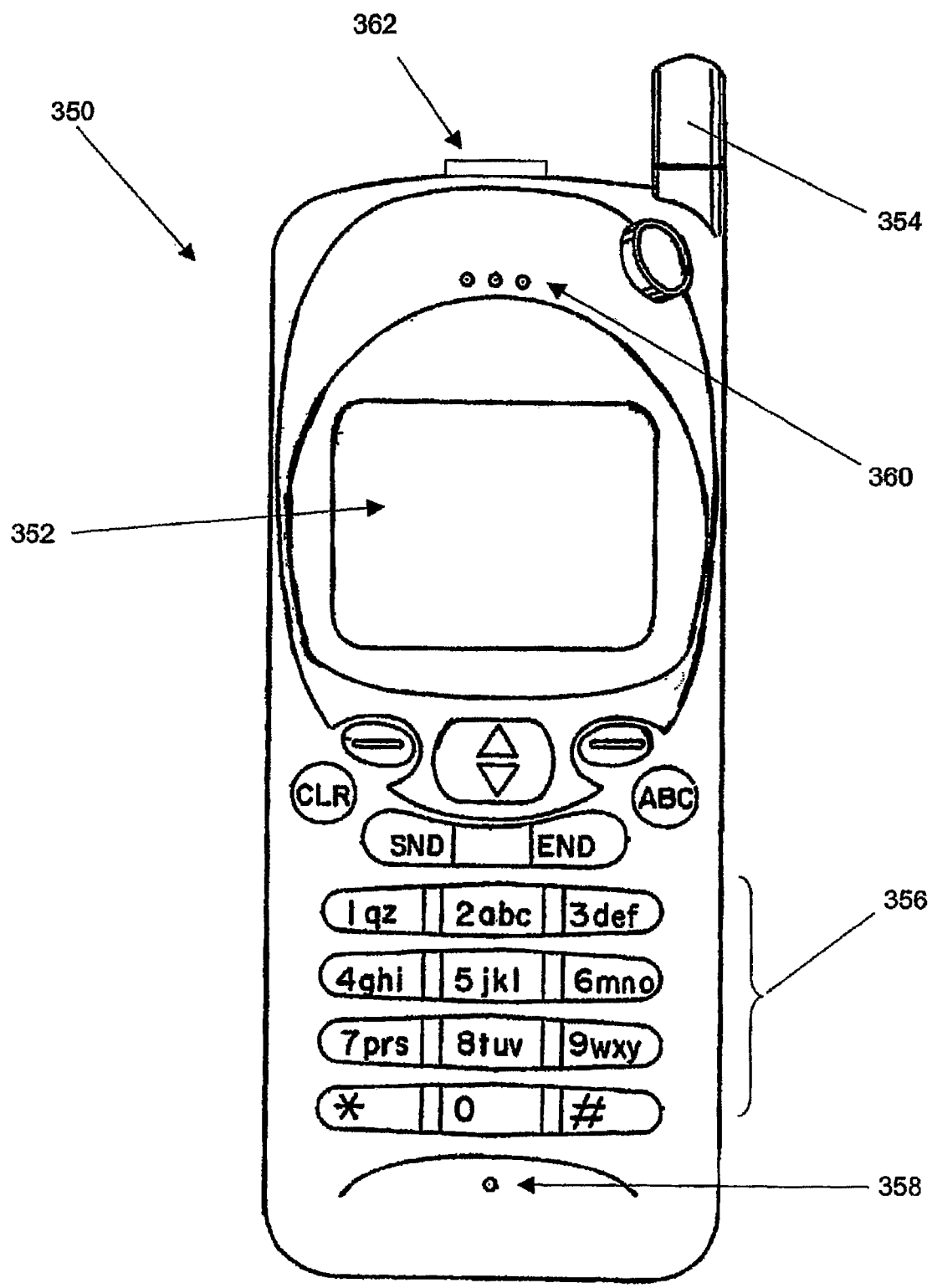
FIG. 25 is a schematic representation of a known mobile terminal.

Before delving into the detail of the communications client, it is appropriate at this juncture to provide a brief background description of a mobile terminal. FIG. 25 is a schematic representation of one such known mobile terminal, in this particular case a mobile telephone.

As shown, the terminal 350 comprises a display 352, an aerial 354 and a plurality of keys 356 arranged in a keypad. The keys, as is known in the art, can be arranged as so-called hard keys with one predetermined function or alternatively they can be arranged as soft-keys which have a plurality of functions depending on the particular operating mode of the terminal. The terminal 350 is provided with a microphone 358 and a loudspeaker 360 for input of user speech and generation of audio signals for relaying to a user. An infra-red input/output port 362 is also provided to permit infrared optical data signals to be received from and/or transmitted to other mobile terminals which are also equipped with an appropriate port.

Figure 26:
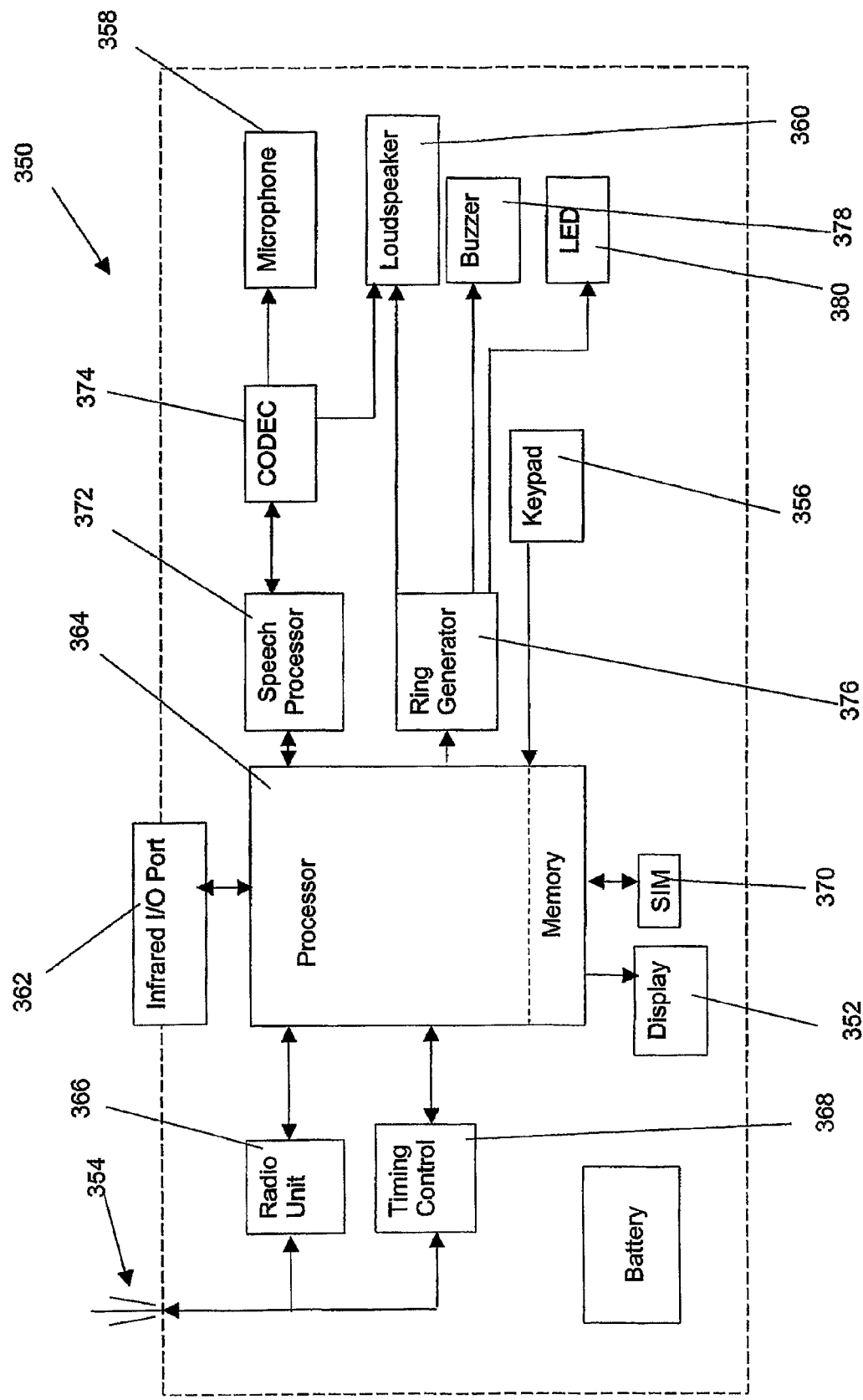
FIG. 26 is a schematic representation of key components of a mobile terminal.

FIG. 26 is a schematic representation of key components of the terminal shown in FIG. 25. As shown the terminal 150 includes a central control unit or processor 364 that, at least in general terms, is operable to control operation of the terminal. Coupled to the processor 364 is a radio unit 366 and timing control circuitry 368 that together are operable to control the transmission and reception of telecommunications signals to and from other telecommunications terminals or from telecommunications networks to which the terminal can connect via the aerial 354.

A removable data storage device or user identity module (SIM) 370 is provided for data and program storage. The data will usually comprise the IMSI (which uniquely identifies the telephone), and other information such as a phonebook of telephone numbers stored on the phone by the user. Software programs may also be stored on the SIM, for example as part of the so-called SIM toolkit (or SIM application toolkit as it is otherwise known).

Coupled to the processor 364 is the display 352, and signals can be sent from the processor to the display in order to convey messages, instructions, and other information to a user of the terminal. The processor is also coupled to the keypad for data input by a user to the terminal.

Sound (for example user speech) picked up by the microphone 358 is processed by a speech processor 372 (for example to remove non-transmittable frequencies), and a coder/decoder (CODEC) 374 that is operable to convert analogue signals generated by the microphone 358 into digital data for subsequent processing. The speech processor 372 and CODEC 374 are also operable to process received digital data and convert it into appropriate audio signals for relaying to a user by means of the loudspeaker 360.

Also coupled to the processor 364 is a ring generator 376 which is operable to generate one of a variety of different alerts which are used to alert a user of the terminal as to when a call, a message or other information is received at the terminal 350. In this particular case the ring generator is operable to generate appropriate signals to drive a vibrating buzzer 378, to illuminate an LED 380 (or bank of illumination devices) or to generate a ring signal for relay to the user via the loudspeaker 360. Typically, a user of the terminal is able to select which of these alert options are most preferable for their current ambient environment. For example, a user who is at work and does not want to disturb his or her colleagues with an audible ring tone might choose the vibrating buzzer as an alternative means to alert them to an arriving call at the terminal.

In accordance with a preferred embodiment of the present invention, the mobile terminal (which may for example be embodied as a mobile telephone such as a GSM or UMTS compatible telephone) includes the aforementioned communications client, and this client will hereafter be referred to as the mobile communications client.

Figure 27:
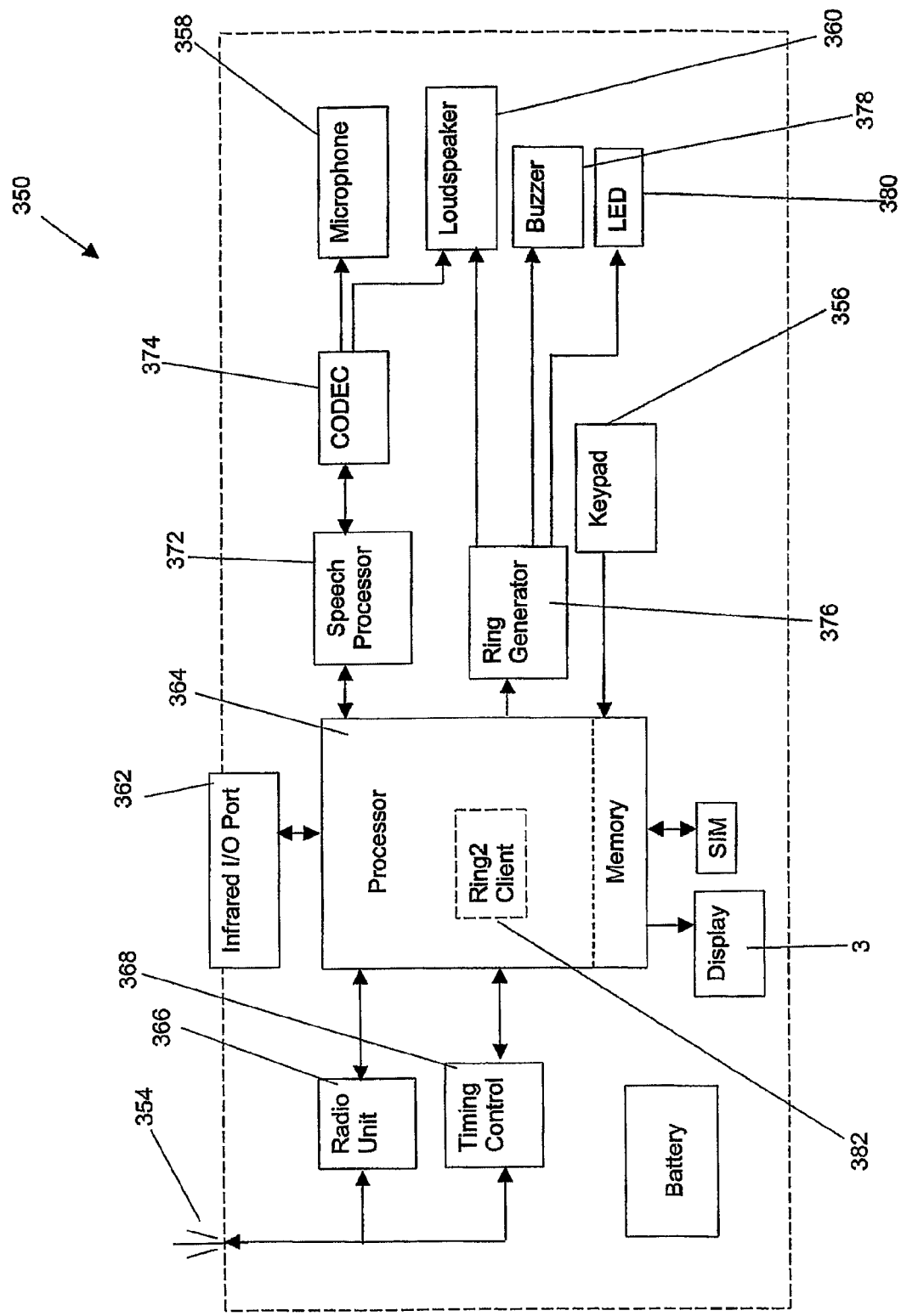
FIG. 27 is a schematic representation of a mobile terminal and software client.

Referring now to FIG. 27, the majority of the components of the terminal 30 depicted therein are the same as those illustrated in FIG. 2, and these components will be referenced with the same numerals as those used above in connection with the description of FIG. 26, and will not further be described herein.

As depicted, the processor 364 comprises a mobile communications client 382 implemented by software executed by the processor 364. The mobile communications client can form part of a so-called SIM Toolkit (or SIM Application toolkit as it is sometimes known), part of the software provided in the mobile terminal, or indeed comprise an applet (such as a Java™ applet for example) downloaded to or pre-stored in the terminal (for example in the SIM). The client is stored in the phone (for example in the SIM or other memory resource) and retrieved as required for execution by the processor.

In normal use of a telephone such as that depicted in FIG. 26, a user would either select a number (or more usually a name with which a number is associated in the phonebook) to dial from the phonebook, or enter a number for dialing by means of the keys. Once entered the user would then push a "connect" button on the terminal (typically labelled with a green representation of a landline handset), whereupon the terminal would commencing signalling with a base transceiver station of a mobile communications network to establish a voice channel between the mobile terminal and the base station and beyond. This signalling is standard and well known to those persons of ordinary skill in the art, and as such will not be described in detail herein.

Figure 28:
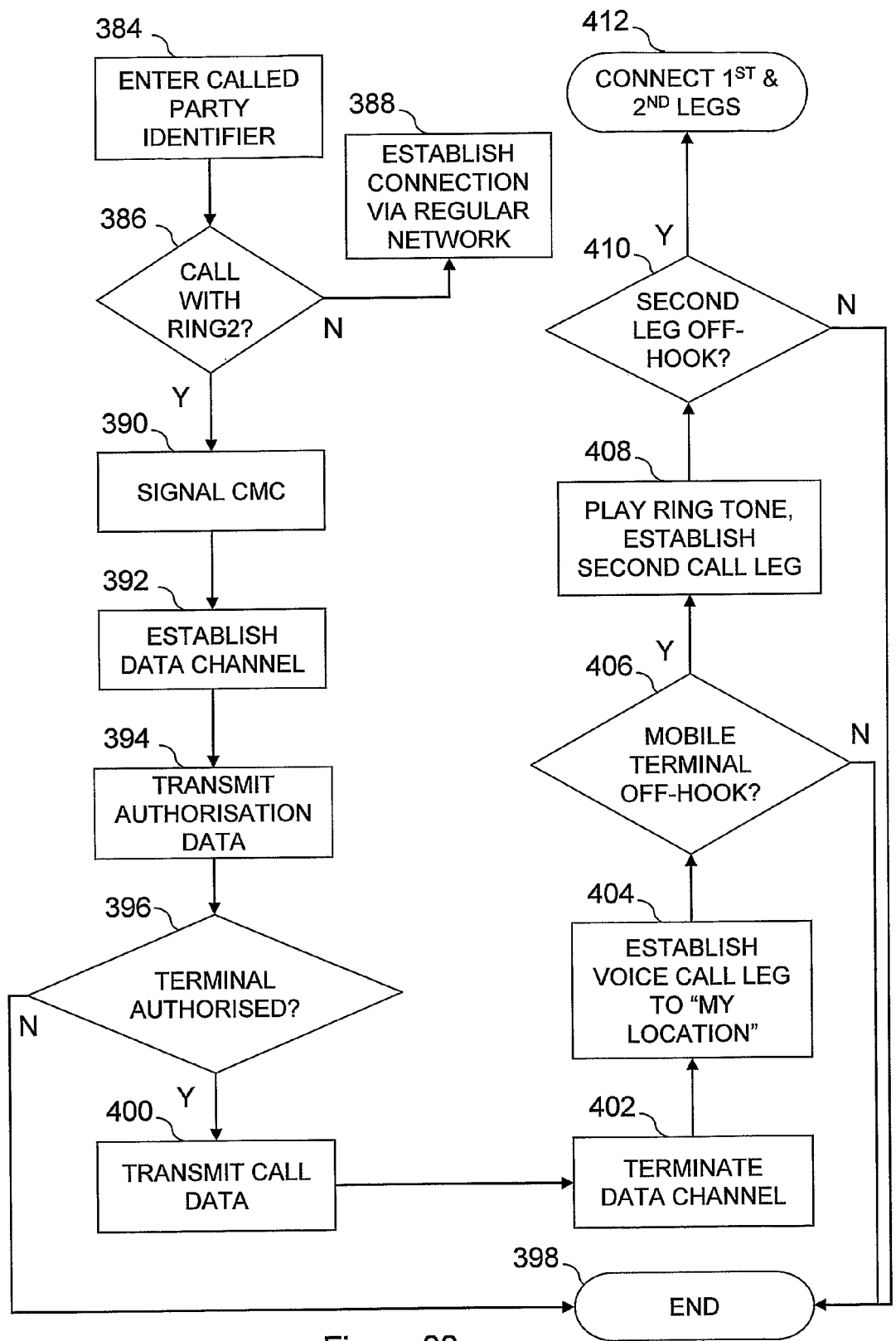
FIG. 28 is a schematic representation of a flowchart depicting one mode of operation of the software client.

As depicted schematically in the flowchart of FIG. 28, in this embodiment of the invention (an embodiment of function (1) above), once a user has entered or selected a number to be called (step 384) they have the option (step 386) to select, for example from a drop-down menu (for menu-driven terminals) or by means of a dedicated key, a "call with Ring2" option to effect a connection to the selected number. If the user chooses not to select the "call with Ring2" option, the call proceeds (Step 388) in the normal way via the wireless telecoms network that the terminal is connected to at that time.

On selection of the "call with Ring2" option, the mobile terminal signals the call management centre 62 (see FIG. 4), in particular the provisioning component 88 thereof via a part of the web server 92 accessible to mobile terminals (step 390), to establish a data communications channel between the call management centre and the mobile terminal 350 (step 392). Following establishment of the data channel information pertaining to the identity of the user is transferred to the provisioning component 88 for authorisation of the terminal (step 394) by comparison of the transmitted identity information to identity information held in the CMC 62 (step 396).

If the transmitted identity information is not verified, the call is terminated (step 398) and a message is displayed to the user at the mobile terminal to advise that they are not authorised to use the Ring2 network to place a call.

Once the terminal has been verified the mobile terminal transmits to the application server (in step 400) the "my location" telephone number (i.e. the number of the mobile terminal from whose phonebook the user has selected a telephone number for the party to be called) and the called party telephone number (or other identifier) selected from the phonebook or manually input by means of the keys (such data hereafter being referred to generically as "call data").

On receipt of the call data from the mobile terminal, the application server 68 of the CMC 62 terminates (step 402) the data communications session with the mobile terminal and then controls the Call Controller/Media Mixer 67 to establish a first voice call leg to the "my location" number specified by the user (step 404), typically the telephone number assigned to the mobile terminal but could alternatively be any identifiable communications terminal such as a PSTN telephone, mobile phone or SIP IP phone device. The "my location" mobile terminal rings, and when the user presses a button or otherwise controls the terminal to go "off-hook" (step 406), a ringing tone is played to the user and the application server sets up a second call leg to the number specified in the aforementioned call data (step 408).

A telephony device associated with the number to be called rings and on pick¬ up by the individual called by the user of the mobile terminal (step 410), the first leg voice call and the second leg voice call are connected by the soft switch 66 to establish a voice communications channel between the mobile terminal and the individual with whom the user of the mobile terminal wishes to communicate (step 412).

The functionality provided by this aspect of the mobile communications client provides the user of the mobile terminal with ready access to the Ring2 network. It can be used, as described, to invoke two-party calling, or in an enhanced aspect it can be used to invoke multi-party calling (e.g. a conference call).

Figure 29:
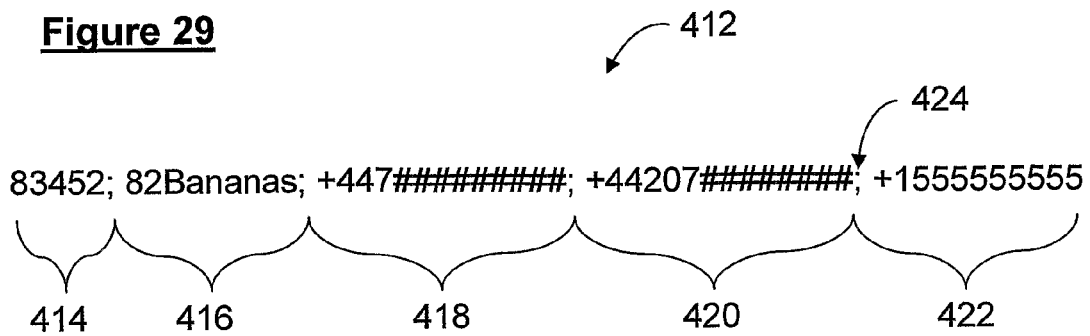
FIGS. 29 and 30 are illustrative representations of message formats.

To invoke multi-party calling, the user need only select or input the telephony identifiers (for example from the phonebook of the mobile terminal) for a number of parties to be called for inclusion in the call data that is transferred to the CMC 62. On receipt of that data the CMC is then operable, as described above for the one called party, to call each of the specified call parties in turn. In an enhancement of the system described, instigation of multi-party calling can conveniently be accomplished by utilising SMS text messaging. FIG. 29 is a schematic representation of an SMS message format 412 for sending to the CMC 62 via an SMS gateway 74 to invoke a multiparty call.

As depicted, the SMS message format 412 comprises a number of individual message components (414 to 422) separated by a separator 424, in this instance a semi-colon ";". The first and second message components 414 comprises a username and a password 416 allocated to the user of the mobile terminal. The third message component 418 comprises the "my location" telephone number mentioned earlier, namely the number at which the mobile terminal user wishes to be called (as the first leg of the call)—typically but not necessarily the number allocated to the user's mobile terminal (in this particular example, the number is a UK mobile telephone number)—and the fourth and fifth components comprise, respectively, a UK landline phone number and a US landline number.

Once the message has been compiled by the user it is sent via the wireless network to the SMS gateway 74 for parsing and conversion to an appropriate format for use by the CMC 62. The CMC, following validation of the user's username and password then proceeds, as described above in connection with FIG. 28 to place calls to each of the parties mentioned in the SMS message 412.

Figure 30:
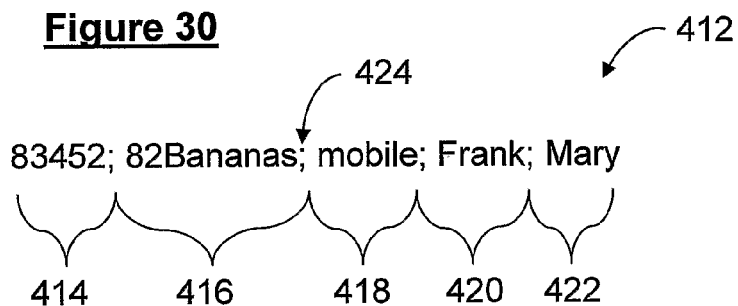

In a variation of this arrangement, the CMC may include a store (not shown) of user selected aliases for often-used phone numbers for that user. Such a store may conveniently be implemented as a record which the user can populate and edit by accessing a web page maintained by the web servers 92. For example, as depicted in FIG. 30, the third message component might be listed in the store under the alias "mobile", the fourth message component might be listed under the alias "Frank", and the fifth component might be listed under the alias "Mary". The advantage of this arrangement, as is immediately evident from a comparison of FIGS. 29 and 30, is that the message length can be greatly reduced.

On receipt of such a message, the application server would interrogate the database for the user identified by the first and second components of the message, and place calls to the numbers associated with any aliases that appear in the message and have a corresponding number stored in the store.

As mentioned above, the mobile communications client 382 is also operable in an embodiment of function (2) above, to enable the user to schedule a conference call from their mobile terminal. To implement this functionality, the Ring2 client can either display a form for the user to populate that then gets posted to the application server via the web server or alternatively, the user can access a web based conference call set up form confirgured for mobile and PDA devices. Such a web page is serverd to end users by the web server (FIG. 4) (if necessary via a WAP gateway) and allows the user (described above in detail) to book a conference call and indicate the participants for that call. Conveniently, the user can—if desired—set the "my location" indicator to the number allocated to their mobile terminal so that they can then participate in the call by using their mobile terminal. For certain mobile terminals, for example some mobile telephones currently offered for sale in the USA, network limitations mean that it is not possible for data and voice channels to be extant between a mobile terminal and a server, and for these terminals the user will have no call-control functionality available as and when the conference call takes place. In other instances where voice and data channels can be open simultaneously the user may, as described above in connection with the desktop implementation of the client terminal, be provided with functionality to execute call control at least of their leg of the conference call, and additionally any other legs of the call if the user at the mobile terminal is designated as the leader of the call.

The mobile communications client 382 is also operable in an embodiment of function (3) above to enable the user to use a mobile terminal as a conference call controller for an ongoing conference call, for example one that the user is participating in. To implement this functionality the user need only book a conference call using their mobile terminal, as described above in connection with function (2) and designate as their "my location" another telephone handset—for example their desktop telephone handset coupled to the PSTN for example via a PBX. In the course of the conference call, the user will be provided with voice data at the handset they have designated as "my location", and call status information (via the aforementioned communications channel established between the mobile terminal and the soft-switches of the CMC. The user can then use their mobile terminal to control the legs of the call that are attributable to them (as described above in detail). This is highly advantageous as it allows the user to port with them the embedded functionality of the mobile communications client, such that the user is provided with the full suite of conference call facilities wherever they have access to a telephone. For example, a user who has booked a conference call to a public telephone that accepts incoming calls (for example a conference call to a public telephone in an airport) can use their handheld terminal to view and control the real-time status of each leg of the call whilst simultaneously participating in the conference call from a public telephone that has no inherent call conferencing functionality.

Figure 31:
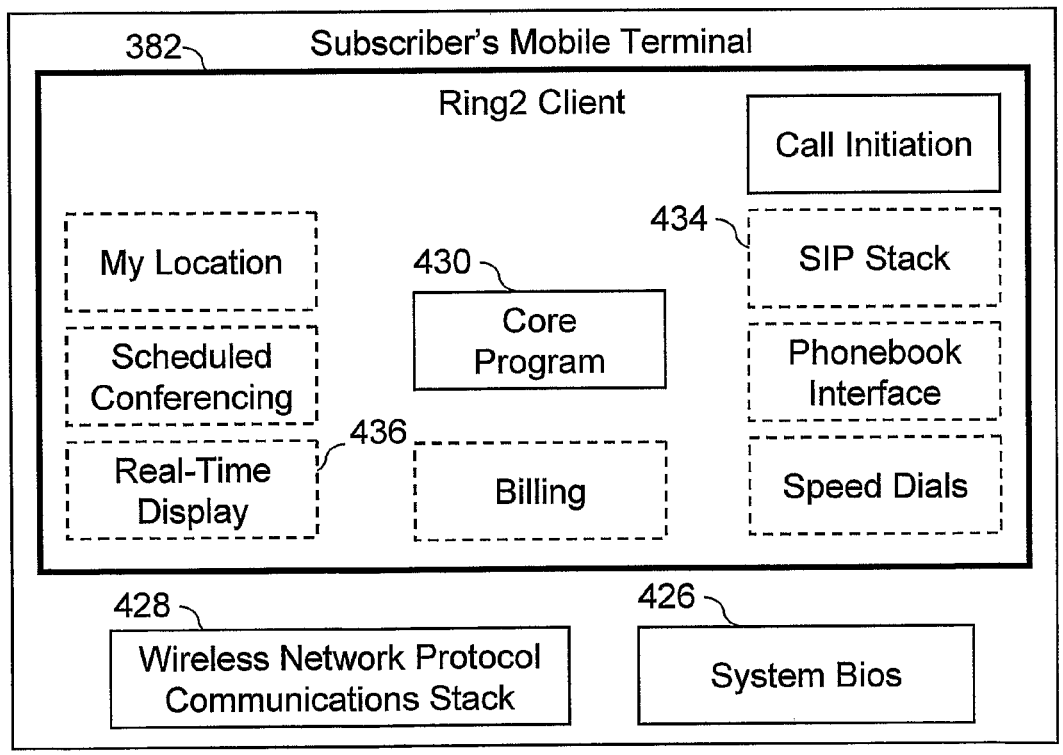
FIG. 31 is an illustrative representation of client software functional components.

FIG. 31 is a schematic representation of the functionality provided by illustrative software components of the aforementioned Ring2 mobile terminal client. It is recognised that the capabilities of mobile terminals vary greatly, and as such some of the software components may not be provided in circumstances where the provision of those features would place too high a load on the processing capabilities of the mobile terminal in question. Those software components which are not strictly necessary have been designated in FIG. 31 with a dashed box outline, but it should be noted that this designation is not necessarily restrictive—that is the components that will actually be essential for any given mobile terminal will in practice vary from terminal to terminal.

Referring now to FIG. 31, the user's mobile terminal includes a system bios component 426, or in other words generic system control software, operable to control the operation of the terminal. The terminal further includes a wireless communications component 428 operable to build up, control and tear down a wireless network protocol communications stack, such as the multi-layer stack commonly used in the GSM network.

The mobile communications client 382 includes a core software component 430 which controls the operation of the client, a call initiation component 432 invoked by the core component 430 when a user wishes to use the mobile communications client to place a call, and a SIP stack component 434 operable to establish a SIP communications protocol dialogue channel between the mobile terminal and the CMC as required to provide the terminal with status updates for display to the user by a real-time display component 436.

In the simplest embodiment of the mobile communications client it may only comprise the core program software component and the call initiation component, and be operable to use the wireless communications stack component of the terminal itself for transferring call data via an extant data channel to the call management centre, whereupon the call management centre drops the data communications channel and opens a voice channel to the mobile terminal (as described above).

Additional software components can be added as required having due regard to the processing power of the terminal on which the communications client is to be executed, until in a well equipped terminal all of the functional elements may be provided. In such an embodiment, particularly in circumstances where the mobile terminal permits simultaneous voice and data communications, the mobile terminal can for all intents and purposes look and operate in the same or similar manner as the desktop embodiment described above in detail.

Whilst various preferred embodiments of the present invention have been described above in detail, it will be appreciated that the scope of the present invention is not limited to those embodiments but instead includes all modifications and alterations to the embodiments described which fall within the spirit and scope of the invention as defined in the accompanying claims.

For example, whilst the communications client has been described above in terms of a client operable by a user to call the various parties to a given conference call one after the other, the user could opt to define a group comprised of a plurality of phone numbers (each belonging to a party to be called) and choose to call all members of the group in one go. Such an arrangement might be advantageous in circumstance where one individual is charged with quickly communicating important information (for example a safety warning) to a plurality of other parties.

Furthermore, insofar as embodiments of the invention described above are implementable, at least in part, using a computer system, it will be appreciated that a computer program for implementing at least part of the described methods and/or the described systems and/or the described data processing apparatus, implementing the communications client 54 and CMC 62, are envisaged as an aspect of the present invention. The computer system may be any suitable apparatus, system or device. For example, the computer system may a programmable data processing apparatus, a general purpose computer, a Digital Signal Processor or a microprocessor. The computer program may be embodied as source code and undergo compilation for implementation on a computer, or may be embodied as object code, for example.

Suitably, the computer program can be stored on a carrier medium in computer usable form, which is also envisaged as an aspect of the present invention. For example, the carrier medium may be solid-state memory, optical or magneto-optical memory such as a readable and/or writable disk for example a compact disk and a digital versatile disk, or magnetic memory such as disc or tape, and the computer system can utilise the program to configure it for operation. The computer program may be supplied from a remote source embodied in a carrier medium such as an electronic signal, including radio frequency carrier wave or optical carrier wave.

Embodiments of the invention may be implemented in software, firmware or hardware or any combination of two or more of software, firmware and hardware.

In view of the foregoing description of particular embodiments of the invention it will be appreciated by a person skilled in the art that various additions, modifications and alternatives thereto may be envisaged. For example, the data processing apparatus may run an execution environment other than Windows®, and may be implemented on an Internet connectable PDA or cellular telephony. In an optional embodiment for a PDA, the PDA is configured such that when a telephone number is selected from a PDA application, for example from an address book, an option such as a menu option is provided for making the call in accordance with the communications client. Selecting this option results in the selected telephone number being sent to the communications client running on the PDA to initiate the call. Additionally, the process flow, order and functions for implementing aspects need not be exactly as described.

The scope of the present disclosure includes any novel feature or combination of features disclosed herein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived herefrom. In particular, with reference to the appended claims, features from dependent claims may be combined with those of the independent claims and features from respective independent claims may be combined in any appropriate manner and not merely in the specific combinations enumerated in the accompanying claims.

The invention claimed is:

1. A method of operating a communications system including a call management server and a communications client at a conference call leader, said communications client providing a user interface, for the establishment of a conference call having a conference call leader call leg and one or more conference call participant call legs, comprising the steps of:
    determining that a conference call participant call leg has become active for said conference call;
    said call management server notifying said communications client at said conference call leader that a conference call participant call leg has become active;
    presenting in response to said notification and without said conference call leader joining the call a message to said conference call leader through said user interface confirming that the conference call has moved from an inactive state, in which there are no participants to the conference call, to an active state, in which there is at least one participant to the conference call; and
    presenting to said conference call leader a mechanism providing the conference call leader both the option to monitor the conference call before the conference call leader joins the call and the option to join the call;
    wherein the method is capable of supporting at least one of said call legs over PSTN.

2. A communications client for a communications system including a call management server and a communications client at a conference call leader, said communications client providing a user interface, for the establishment of a conference call having a conference call leader call leg and one or more conference call participant call legs, said communications client being configured
    to receive a notification from the call management server that, for an inactive conference call, a conference call participant call leg has become active;
    to present automatically in response to said notification and without said conference call leader joining the call a message to the conference call leader through said user interface confirming that the conference call has moved from an inactive state, in which there are no participants to the conference call, to an active state, in which there is at least one participant to the conference call; and
    to present a mechanism providing the conference call leader both the option to monitor the conference call before the conference call leader joins the call and the option to join the call;
    wherein the communication system is capable of supporting at least one of said call legs over PSTN.

3. A communications client according to claim 2, automatically responsive to a call status signal to display an icon indicative of the status of a corresponding conference call participant call leg.

4. A communications client according to claim 3, operative to display at least one user actuatable icon indicative of a call control function for said corresponding conference call participant call leg and responsive to user actuation of said icon to transmit a call control signal to said call management service to implement a call control function.

5. A communications client according to claim 4, operative to display a plurality of user actuatable icons corresponding to each conference call participant call leg, respective icons being user actuatable to transmit a call control signal to said call management service to mute, hold or drop a corresponding call leg.

6. A communications client according to claim 5, wherein an icon displays a conference call participant call leg state and said communications client is responsive to user actuation of said icon to send a call control message to said call management service to implement a call control function to toggle said call state.

* * * * *